(12) United States Patent
Umehara

(10) Patent No.: US 11,695,120 B2
(45) Date of Patent: Jul. 4, 2023

(54) ELECTRODE SHEET, BATTERY INCORPORATING THE ELECTRODE SHEET, METHOD FOR MANUFACTURING THE ELECTRODE SHEET, METHOD FOR MANUFACTURING THE BATTERY INCORPORATING THE ELECTRODE SHEET, AND DIE HEAD

(71) Applicant: TOYOTA JIDOSHA KABUSHIKI KAISHA, Toyota (JP)

(72) Inventor: Masakazu Umehara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 377 days.

(21) Appl. No.: 16/553,569

(22) Filed: Aug. 28, 2019

(65) Prior Publication Data
US 2020/0136133 A1 Apr. 30, 2020

(30) Foreign Application Priority Data

Oct. 31, 2018 (JP) .................................. 2018-205383

(51) Int. Cl.
*H01M 4/00* (2006.01)
*H01M 4/62* (2006.01)
(Continued)

(52) U.S. Cl.
CPC ........... *H01M 4/628* (2013.01); *H01M 4/043* (2013.01); *H01M 4/0404* (2013.01);
(Continued)

(58) Field of Classification Search
CPC ........... H01B 5/02; H01B 13/00; H01M 4/02; H01M 2004/025; H01M 4/0404; H01M 4/04

See application file for complete search history.

(56) References Cited

U.S. PATENT DOCUMENTS

2013/0048340 A1 2/2013 Bando et al.
2014/0261674 A1 9/2014 Youngbull et al.
(Continued)

FOREIGN PATENT DOCUMENTS

| CN | 102969480 A | 3/2013 |
|---|---|---|
| CN | 104174565 A | 12/2014 |
| CN | 107112496 A | 8/2017 |
| JP | 2013-051035 A | 3/2013 |
| JP | 2015026471 A | 2/2015 |
| JP | 2017136551 A | 8/2017 |
| KR | 20130024766 A | 3/2013 |

(Continued)

*Primary Examiner* — Cynthia H Kelly
*Assistant Examiner* — Monique M Wills
(74) *Attorney, Agent, or Firm* — Dickinson Wright, PLLC

(57) ABSTRACT

A strip-shaped electrode sheet includes an electrode foil including a strip-shaped foil exposed portion in which the electrode foil is exposed, a strip-shaped active material layer extending in a longitudinal direction, and a strip-shaped insulator layer containing insulating resin and formed on an insulator-layer support portion along a one-side layer edge portion of the active material layer and between the foil exposed portion of the electrode foil and an active-material-layer support portion. The insulator layer is located lower than a top face of the active material layer toward the electrode foil and includes a slant coating portion covering at least a lower portion of a one-side slant portion of the active material layer and a foil coating portion extending from the slant coating portion in a width-direction one side and covering the insulator-layer support portion of the electrode foil.

8 Claims, 19 Drawing Sheets

(51) Int. Cl.
*H01M 4/1391* (2010.01)
*H01M 4/04* (2006.01)
*H01M 4/131* (2010.01)
*H01M 10/42* (2006.01)
*H01M 4/139* (2010.01)
*H01M 10/0587* (2010.01)
*H01M 4/02* (2006.01)
*H01M 10/0525* (2010.01)

(52) U.S. Cl.
CPC ............ *H01M 4/131* (2013.01); *H01M 4/139* (2013.01); *H01M 4/1391* (2013.01); *H01M 10/0587* (2013.01); *H01M 10/4235* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2015/0017523 A1* | 1/2015 | Hirai | H01M 4/70 |
| | | | 429/211 |
| 2016/0043373 A1 | 2/2016 | Arishima et al. | |
| 2017/0317390 A1 | 11/2017 | Sato | |
| 2018/0345310 A1 | 12/2018 | Watanabe et al. | |

FOREIGN PATENT DOCUMENTS

| | | |
|---|---|---|
| WO | 2014162437 A1 | 10/2014 |
| WO | 2015156213 A1 | 10/2015 |
| WO | 2016067706 A1 | 5/2016 |
| WO | 2017163846 A1 | 9/2017 |

* cited by examiner

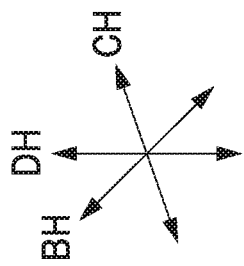
FIG. 1
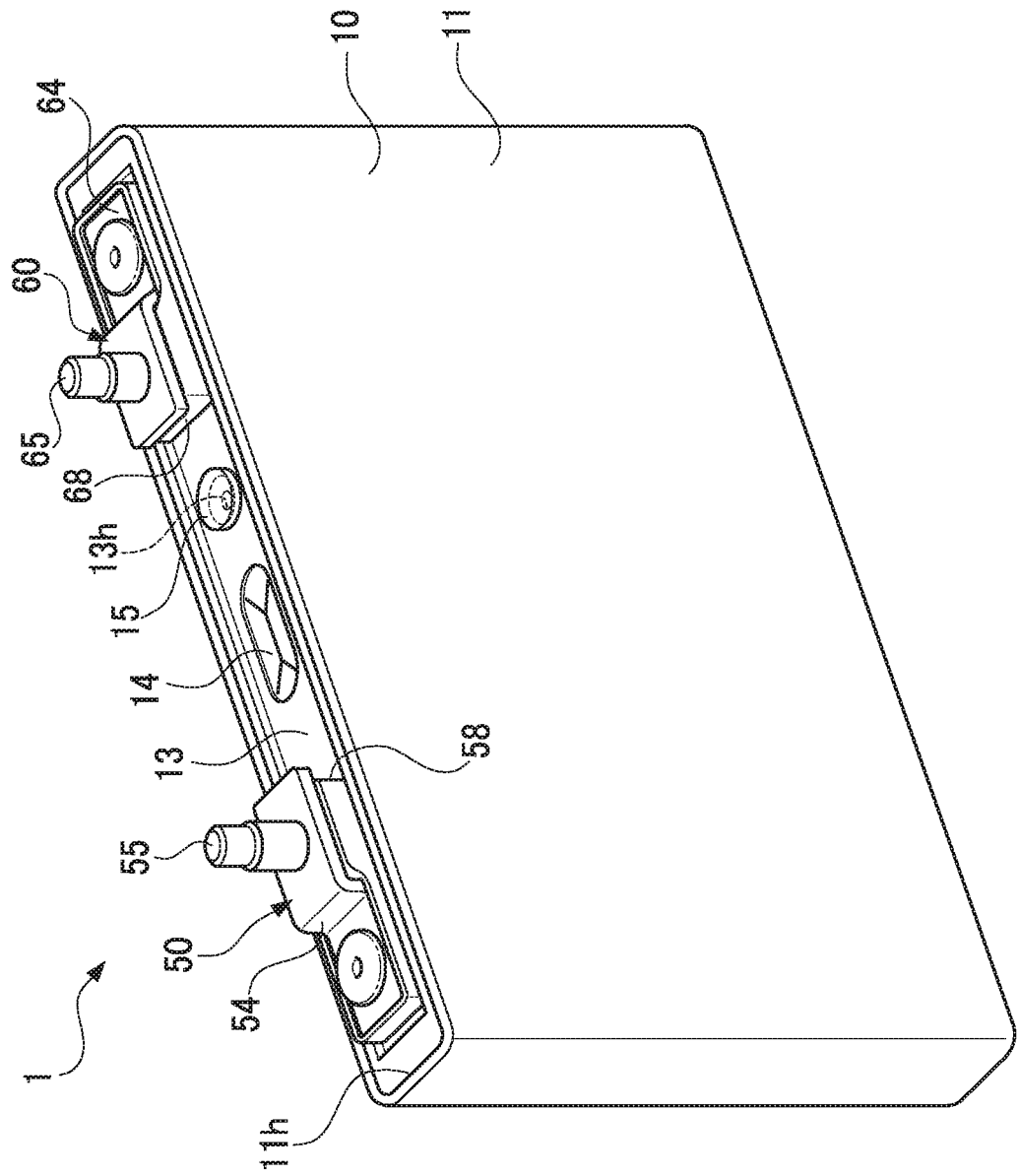

ELECTRODE SHEET, BATTERY INCORPORATING THE ELECTRODE SHEET, METHOD FOR MANUFACTURING THE ELECTRODE SHEET, METHOD FOR MANUFACTURING THE BATTERY INCORPORATING THE ELECTRODE SHEET, AND DIE HEAD

CROSS-REFERENCE TO RELATED APPLICATIONS

This application is based upon and claims the benefit of priority from the prior Japanese Patent Applications No. 2018-205383 filed on Oct. 31, 2018, the entire contents of which are incorporated herein by reference.

BACKGROUND

Technical Field

The present disclosure relates to an electrode sheet, a battery incorporating the electrode sheet, a method for manufacturing the electrode sheet, a method for manufacturing the battery incorporating the electrode sheet, and a die head.

Related Art

As an electrode sheet (a positive electrode sheet and a negative electrode sheet) to be used in lithium ion secondary batteries, capacitors, and others, there is known a strip-shaped electrode sheet including a strip-shaped electrode foil having a foil exposed portion in which the electrode foil is exposed, or uncoated, along a foil edge on one side in a width direction while an active material layer is formed on the other side in the width direction so as to extend in a longitudinal direction. Such an electrode sheet is manufactured for example by the following method. Specifically, active material paste containing active material particles, solvent, and others is discharged from a die head to a central part of the surface of the strip-shaped electrode foil in the width direction while simultaneously feeding the electrode foil relatively in the longitudinal direction to form a strip-shaped undried active material layer on the electrode foil. Successively, while this undried electrode sheet is fed, the undried active material layer is heated and dried in a drying furnace, thereby forming an active material layer. In addition, another active material layer is formed on the back surface of the electrode foil in the same manner. This electrode sheet is then cut in half in the width direction to produce strip-shaped electrode sheets. As needed, these strip-shaped electrode sheets may be further cut at a predetermined length in the longitudinal direction into a plurality of rectangular electrode sheets.

In each strip-shaped electrode sheet or rectangular electrode sheet, a foil exposed portion in which the electrode foil is exposed, or uncoated, is utilized as a current collecting part which is connected to an external terminal for external connection.

Meanwhile, countermeasures against internal short-circuit of a battery may be taken by the manners as described in for example WO2015/156213 (see FIG. 7 of this document) and WO2014/162437 (see FIGS. 5 and 6 of this document). Specifically, a strip-shaped insulator layer is formed at an end of the foil exposed portion of the strip-shaped electrode sheet or rectangular electrode sheet on the other side in the width direction (i.e., on the side close to the active material layer) so that the insulator layer extends in a longitudinal direction.

The method for forming such an insulator layer may include the following methods. In one method, an active material layer is formed by application of active material paste onto an electrode foil and an insulator layer is formed by application of insulator paste, those forming steps are performed almost simultaneously (see WO2014/162437). In another method, active material paste and insulator paste are simultaneously applied to an electrode foil by a die coater including a slot for discharging the active material paste and additionally, on both sides of this slot, slots for discharging the insulator paste (see WO2015/156213). In a die coater 18 shown in FIG. 6 of WO2015/156213, a slot 24 for discharging a positive electrode material (i.e., the active material paste) 5 and slots 25 and 26, located on both sides of the slot 24, for discharging a first insulation material (i.e., the insulator paste) 19 are not spaced apart from each other.

SUMMARY

Technical Problems

However, in forming the insulator layer along the edge portion of the active material layer on the one side ("one-side layer edge portion") as above, if the active material paste is applied to the electrode foil after application of the insulator paste as disclosed in WO2014/162437, the active material layer is located more outside than (i.e., above) the insulator layer in a region where the pastes overlap each other. Thus, of the one-side layer edge portion of the active material layer, a one-side slant portion in which the active material layer has a thinner thickness as closer to the one side in the width direction cannot be covered and insulated by the insulator layer.

To the contrary, if the active material paste is applied to an electrode foil first and then the insulator paste is applied thereto, an insulator layer can be formed covering the one-side slant portion of the active material layer. However, the insulator layer may override not only the one-side slant portion of the active material layer but also a flat top face of the active material layer. In this portion, therefore, the total thickness of the two layers, i.e., the active material layer and the insulator layer, is larger than the thickness of the active material layer not covered by the insulator layer. In the case of producing a wound electrode body by winding the above strip-shaped electrode sheet in a roll form or winding it together with a strip-shaped electrode sheet having an opposite polarity by interposing separators therebetween, some troubles may be caused; for example, those sheets could not be appropriately wound, misalignment may occur between those sheets, or uniform contact pressure could not be applied on the strip-shaped electrode body. On the other hand, even for a rectangular electrode body, in the case of producing a laminated electrode body by laminating the rectangular electrode sheets in layers with rectangular electrode sheets having an opposite polarity by interposing separators therebetween, uniform contact pressure could not be applied on the electrode body.

Meanwhile, when the active material paste and the insulator paste are parallelly and simultaneously applied to the electrode foil by use of the die coater (the die head) as disclosed in WO2015/156213, the active material paste and the insulator paste may mix together at the interface therebetween. However, in general, a solid content ratio of the active material paste is higher than a solid content ratio of the insulator paste. Accordingly, as the active material paste and the insulator paste are applied in the longitudinal direction (i.e., the feeding direction), those pastes mix with each other in a marbling form to leave individual regions without blending into each other. Therefore, if the active material paste and the insulator paste are strongly mixed with each other at their interface, a part of the insulator layer mixed in the one-side layer edge portion of the active material layer may override, or overlap, the active material layer. In such a case, the layer thickness of this overlapping portion may become larger than the thickness of a flat portion of the active material layer which the insulator layer does not overlap. Furthermore, a part of the active material layer may be exposed from the insulator layer covering the one-side slant portion of the active material layer, resulting in diminishing of the effect of the insulator layer applied.

Besides, if a short-circuit is contemplated as being caused between the electrode sheet having one polarity (e.g., a positive electrode sheet) and the electrode sheet having the opposite polarity (e.g., a negative electrode sheet) due to conductive foreign substances, such as micro metallic pieces, a short-circuit caused between a foil exposed portion of the one-polarity electrode sheet and the opposite-polarity electrode sheet due to the conductive foreign substances is lower in resistance in a path, causing a large amount of current to flow, resulting in large heat generation, as compared with a short-circuit caused between the active material layer of the one-polarity electrode sheet and the opposite-polarity electrode sheet due to the conductive foreign substances.

To avoid such defects, it is often desired to form an insulator layer over a width-direction other-side part of the foil exposed portion in which the electrode foil of the electrode sheet is exposed, the width-direction other-side part being located on the other side of the foil exposed portion in the width direction (i.e., the side close to the active material layer) which will be placed near the opposite-polarity electrode sheet when assembled into a finished battery.

However, if a gap is left between the one-side layer edge portion of the active material layer and the insulator layer provided on the width-direction other-side part of the foil exposed portion of the electrode foil, the conductive foreign substance(s) may be caught in the gap and difficult to drop off. This configuration may also cause a risk of a short-circuit.

The present disclosure has been made to address the above problems and has a purpose to provide a strip-shaped electrode sheet and a rectangular electrode sheet each provided with an insulator layer in an appropriate form, a battery incorporating either electrode sheet, a method for manufacturing the strip-shaped electrode sheet, a method for manufacturing the rectangular electrode sheet, a method for manufacturing a battery incorporating either electrode sheet, and a die head suitable for manufacturing the electrode sheets.

Means of Solving the Problems

To achieve the above-mentioned purpose, one aspect of the present disclosure provides a strip-shaped electrode sheet comprising: a strip-shaped electrode foil extending in a longitudinal direction, the electrode foil including a one-side foil edge on one side in a width direction of the electrode foil and a strip-shaped foil exposed portion extending along the one-side foil edge in the longitudinal direction, in which the electrode foil is exposed; a strip-shaped active material layer extending in the longitudinal direction, the active material layer being formed on an active-material-layer support portion of the electrode foil on an other side in the width direction relative to the foil exposed portion; and a strip-shaped insulator layer extending in the longitudinal direction and containing insulating resin, the insulator layer being formed along a one-side layer edge portion of the active material layer located on the one side in the width direction and on an insulator-layer support portion of the electrode foil located between the foil exposed portion and the active-material-layer support portion, wherein the one-side layer edge portion of the active material layer includes a one-side slant portion in which the active material layer has a thinner thickness as closer to the one side in the width direction, the insulator layer is located lower than a top face of the active material layer toward the electrode foil, and the insulator layer includes: a slant coating portion that covers at least a lower portion of the one-side slant portion of the active material layer; and a foil coating portion that extends from the slant coating portion toward the one side in the width direction to cover the insulator-layer support portion of the electrode foil.

If the surface of the insulator layer is located higher than the top face of the active material layer, that is, if the insulator layer is raised higher than the insulator layer or if the insulator layer is formed up to the top face of the active material layer, when the strip-shaped electrode sheet is to be wound up or the strip-shaped electrode sheet is wound to form a wound electrode body, this electrode sheet could not be appropriately wound. When a wound electrode body is formed of this strip-shaped electrode sheet and contact pressure is applied to the top face of the active material layer, the force acts on the insulator layer located higher than the top face of the active material layer, so that the active material layer located near the pressurized area is not subjected to the contact pressure, that is, the top face of the active material layer is not pressurized uniformly.

In contrast, in the strip-shaped electrode sheet in the aforementioned configuration, the insulator layer is located at the lower level than the top face of the active material layer.

Accordingly, when this strip-shaped electrode sheet is to be wound up or to be wound to form a wound electrode body, this electrode sheet can be appropriately wound. When a wound electrode body is formed of this strip-shaped electrode sheet and the contact pressure is applied to the top face of the active material layer, the entire top face of the active material layer can be pressurized uniformly.

In this strip-shaped electrode sheet, moreover, the slant coating portion of the insulator layer covers at least the lower portion of the one-side slant portion of the active material layer and besides the foil coating portion of the insulator layer extends from the slant coating portion toward the one side in the width direction to cover the insulator-layer support portion of the electrode foil.

Thus, the lower portion of the one-side slant portion of the active material layer can be insulated by the slant coating portion and further the insulator-layer support portion of the electrode foil can be covered and insulated by the foil coating portion. Since the foil coating portion is formed continuous with the slant coating portion, no gap is left between the insulator layer and the active material layer, thereby enabling to reduce a risk that a conductive foreign substance(s) may be caught in the gap.

Herein, the strip-shaped electrode sheet may include a configuration that only one surface of a strip-shaped electrode foil is formed with an active material layer and an insulator layer and a configuration that each surface of a strip-shaped electrode foil is formed with an active material layer and an insulator layer.

The configuration that an insulator layer is located lower toward the electrode foil than the top face of an active material layer indicates that the insulator layer is located at a position closer to the electrode foil relative to the top face of the active material layer when viewed in a thickness direction of an electrode layer.

The electrode foil to be used for the strip-shaped electrode sheet may include metallic foils, such as aluminum foils and copper foils.

The active material layer may include a positive active material layer and a negative active material layer each containing active material particles, conductive material, binder, and others. The active material particles may include for example positive active material particles such as lithium transition metal composite oxide, concretely, lithium nickel cobalt manganese oxide, and negative active material particles such as graphite and acetylene black (AB). The conductive material may include conductive particles such as graphite and acetylene black. The binder may include for example resin such as polyvinylidene fluoride (PVDF) and polytetrafluoroethylene (PTFE). The insulation resin to be used for the insulator layer may include for example PVDF, acryl, polyethylene, polyethylene terephthalate (PET), polyimide, and polyamide.

In the foregoing strip-shaped electrode sheet, the slant coating portion of the insulator layer may have a thickness that is thicker than a thickness of the foil coating portion.

The one-side slant portion of the active material layer is not so smooth with asperities as compared with the insulator-layer support portion of the electrode foil. Thus, if the thickness (Ts) of the slant coating portion of the insulator layer is equal to or thinner than the thickness (Tt) of the foil coating portion, the slant coating portion can only cover and insulate the one-side slant portion of the active material layer with low reliability.

In contrast, in the strip-shaped electrode sheet configured as above, the thickness of the slant coating portion is designed to be thicker than the thickness of the foil coating portion (Ts>Tt). Accordingly, the slant coating portion of the insulator layer can cover and insulate the one-side slant portion of the active material layer with high reliability.

In the foregoing strip-shaped electrode sheet, the insulator layer may contain inorganic insulation powder.

In the strip-shaped electrode sheet configured as above, the insulator layer contains inorganic insulation powder. Thus, even in case a micro short-circuit or the like occurs and the temperature near the insulator layer rises, the inorganic insulation powder can maintain insulation.

The inorganic insulation powder may include insulative ceramic powder; for example, alumina powder, boehmite powder, mullite powder, silica powder, magnesia powder, titania powder, silicon nitride powder. Insulating glass powder such as silica glass can also be adopted.

In particular, alumina powder exhibiting high temperature resistance is preferably used. If ablation of a die head due to application of insulator paste is taken into consideration, boehmite powder may be adopted because of relative softness.

In the foregoing strip-shaped electrode sheet, the active material layer may contain positive active material particles made of metal oxide.

In the above strip-shaped electrode sheet, the active material layer contains positive active material particles made of metal oxide. Thus, this strip-shaped electrode sheet is a positive electrode sheet.

In general, for a negative electrode sheet, a negative active material layer is formed of e.g. graphite as negative active material particles. On the other hand, if a positive active material layer of a positive electrode sheet is formed of positive active material particles of metal oxide such as lithium transition metal composite oxide, the negative active material layer is lower in resistance than the positive active material layer. Therefore, as compared with the case where a short-circuit occurs between the positive active material layer containing positive active material particles made of metal oxide and the negative electrode sheet (the negative active material layer or the negative current collecting foil) due to conductive foreign substance(s), in a case where a short-circuit occurs between the negative active material layer containing negative active material particles such as graphite and the positive current collecting foil (the electrode foil) of the positive electrode sheet due to conductive substance(s), lower resistance is generated, causing a large amount of current to flow through the short-circuit. This situation is particularly undesirable.

In contrast, for the positive electrode sheet formed by use of positive active material particles made of metal oxide, the insulator layer is formed on the positive current collecting foil which is the electrode foil by the foregoing method in the present disclosure. This makes it possible to prevent the occurrence of a short-circuit between the positive current collecting foil and the negative electrode sheet (the negative active material layer or the negative current collecting foil) which may cause a large flow rate of current to flow.

Another aspect of the present disclosure provides a rectangular electrode sheet made of the foregoing strip-shaped electrode sheet, the strip-shaped electrode sheet being cut at a predetermined length in the longitudinal direction.

If the insulator layer is located higher than the top face of the active material layer, that is, if the insulator layer is raised higher than the active material layer or if the insulator layer is formed up to the top face of the active material layer, when the strip-shaped electrode sheets are laminated to form a laminated electrode body, the following undesirable states are caused. When contact pressure is applied to the top face of the active material layer, the force acts on the insulator layer located higher than the top face of the active material layer, so that the active material layer located near the insulator layer is not subjected to the contact pressure, that is, the top face of the active material layer is not pressurized uniformly.

In the strip-shaped electrode sheet configured as above, in contrast, the insulator layer is located lower than the top face of the active material layer.

When a laminated electrode body is formed of this rectangular electrode sheet and the contact pressure is applied to the top face of the active material layer, the entire top face of the active material layer can be pressurized uniformly.

Furthermore, even in the rectangular electrode sheet configured as above, the slant coating portion of the insulator layer covers at least a lower portion of the one-side slant portion of the active material layer, and further the foil coating portion of the insulator layer covers a part of the electrode foil, the part being located on the other side in the width direction relative to the foil exposed portion.

Thus, the slant coating portion can insulate the lower portion of the one-side slant portion of the active material layer and further the foil coating portion can cover and insulate the portion of the electrode foil located on the other side in the width direction relative to the foil exposed portion. In addition, since the foil coating portion continuously extends from the slant coating portion, no gap is left between the insulator layer and the active material layer, thereby reducing a risk that a foreign substance(s) may be caught in the gap.

Another aspect of the present disclosure provides a battery incorporating the foregoing strip-shaped electrode sheet or rectangular electrode sheet.

The above battery incorporates either the strip-shaped electrode sheet or the rectangular electrode sheet. Thus, in a wound electrode body or a laminated electrode body including such an electrode sheet, the entire top face of the active material layer can be uniformly pressurized. This can achieve a battery having stable performance.

Another aspect provides a method for manufacturing a strip-shaped electrode sheet, the strip-shaped electrode sheet comprising: a strip-shaped electrode foil extending in a longitudinal direction, the electrode foil including a one-side foil edge on one side in a width direction of the electrode foil and a strip-shaped foil exposed portion extending along the one-side foil edge in the longitudinal direction, in which the electrode foil is exposed; a strip-shaped active material layer extending in the longitudinal direction, the active material layer being formed on an active-material-layer support portion of the electrode foil on an other side in the width direction relative to the foil exposed portion; and a strip-shaped insulator layer extending in the longitudinal direction and containing insulating resin, the insulator layer being formed along a one-side layer edge portion of the active material layer located on the one side in the width direction and on an insulator-layer support portion of the electrode foil located between the foil exposed portion and the active-material-layer support portion, wherein the one-side layer edge portion of the active material layer includes a one-side slant portion in which the active material layer has a thinner thickness as closer to the one side in the width direction, the insulator layer is located lower than a top face of the active material layer toward the electrode foil, and the insulator layer includes: a slant coating portion that covers at least a lower portion of the one-side slant portion of the active material layer; and a foil coating portion that extends from the slant coating portion toward the one side in the width direction to cover the insulator-layer support portion of the electrode foil, wherein the method comprises: a coating step of applying active material paste and insulator paste each discharged from a die head respectively to the active-material-layer support portion and the insulator-layer support portion of the electrode foil that is being fed in the longitudinal direction to form an undried active material layer and an undried insulator layer; and a drying step of drying the undried active material layer and the undried insulator layer to form the strip-shaped electrode sheet including the active material layer and the insulator layer, wherein the die head includes: a first slot extending straight in the width direction and configured to discharge the active material paste; and a second slot located on the one side in the width direction relative to the first slot and arranged in line with the first slot at a predetermined distance, the second slot being narrower in the width direction than the first slot and configured to discharge the insulator paste, the coating step includes causing the undried active material layer made of the active material paste discharged from the first slot and applied to the electrode foil to spread on the electrode foil toward the one side in the width direction and contact with the undried insulator layer made of the insulator paste discharged from the second slot and applied to the electrode foil with a clearance from the undried active material layer from the other side in the width direction on the electrode foil, so that a portion of the undried insulator layer located on the other side in the width direction overrides an undried one-side slant portion of the undried active material layer, in which the undried active material layer is thinner in thickness as closer to the one side in the width direction.

In the above manufacturing method, the coating step uses the die head including the first slot having a straight linear shape and the second slot having a narrow width arranged on the one side in the width direction relative to the first slot.

The undried active material layer made of the positive active material paste discharged from the first slot of the die head slightly spreads in the width direction and then becomes stable. Specifically, the undried active material layer (the active material layer) is formed with a size in the width direction ("width-direction size") slightly larger (e.g., by about 1% to 2%) than the width-direction size of the first slot. The same applies to the undried insulator layer made of the insulator paste discharged from the second slot.

The undried active material layer applied to the electrode foil spreads over the electrode foil on the one side in the width direction and comes into contact, from the other side in the width direction, with the undried insulator layer applied to the electrode foil with a predetermined clearance from the undried active material layer, so that a portion of the undried insulator layer on the other side in the width direction overrides the undried one-side slant portion of the undried active material layer. Subsequently, in the drying step, the undried active material layer and the undried insulator layer are dried. Thus, an electrode sheet including an active material layer and an insulator layer is obtained.

In the above method, using the die head, the active material paste and the insulator paste (i.e., the undried active material layer and the undried insulator layer) are applied with a clearance between each other to the electrode foil and thereafter the undried active material layer spreading in the width direction is caused to contact with the undried insulator layer from the other side in the width direction.

Thus, the active material layer and the insulator layer are prevented from separating from each other to leave a gap therebetween.

On the other hand, another method is also conceivable to discharge the active material paste and the insulator paste without leaving a spacing therebetween or to discharge the active material paste and the insulator paste from the die head in which the active material paste and the insulator paste are already arranged in a contact state. However, in such cases, the undried active material layer and the undried insulator layer are strongly contact, resulting in their excessive mixture at the interface.

In contrast, in the present disclosure, the undried active material layer and the undried insulator layer may mix at their interface; however, excessive mixture is prevented as compared with the above cases. Thus, the degree of mixture is low. Accordingly, the method configured as above can prevent a configuration that the undried active material layer and the undried insulator layer so largely mix as to cause a part of the insulator layer to override to a higher level than the top face of the active material layer or a configuration that the insulator layer could not sufficiently cover the mixed active material layer, for example, a part of the active material layer is exposed from the insulator layer.

Specifically, the insulator layer can be reliably formed to include the slant coating portion that is located lower than the top face of the active material layer and covers a part of the one-side slant portion of the active material layer, and the foil coating portion extending from the slant coating portion on the one side in the width direction.

In the coating step and the drying step, additionally, the active material layer and the insulator layer are simultaneously formed and dried. Thus, an electrode sheet can be manufactured in a short process and at low cost.

For discharging from the die head, to make the undried active material layer and the undried insulator layer contact with each other while applying the active material paste and the insulator paste (the undried active material layer and the undried insulator layer) with a clearance from each other to the electrode sheet, it is necessary to consider the magnitude of the pressure to be applied to the active material paste and the insulator paste and their viscosity and further the size of the clearance between the active material paste and the insulator paste at the time of discharging from the die head, that is, the distance between the first slot and the second slot of the die head may be set to an appropriate value.

The discharging direction of the insulator paste from the second slot toward the electrode foil may be adjusted to either an inclination to the other side in the width direction or an inclination to the one side in the width direction. The discharging angle at that time may be adjusted.

In the forgoing strip-shaped electrode sheet manufacturing method, the die head may be configured to discharge the insulator paste from the second slot toward the electrode foil opposed to the second slot and toward the other side in the width direction.

In the above manufacturing method, the insulator paste is discharged from the second slot toward the electrode foil and also toward the other side in the width direction. Thus, the undried insulator layer is easy to spread on the other side in the width direction, making the undried active material layer and the undried insulator layer easily contact with each other on the electrode foil.

A concrete configuration of the above die head may be for example a die head including a second passage configured to direct the second paste to the second slot, the second passage having a shape allowing the second paste flowing toward the second slot to move forward and toward the other side in the width direction.

In the forgoing strip-shaped electrode sheet manufacturing method, the second slot of the die head may have a size in a feeding direction set different from a size of the first slot in the feeding direction.

The die head used in the above manufacturing method is for example constituted of an upstream-side head body, a downstream-side head body, and a shim interposed between those upstream-side and downstream-side head bodies. The active material paste pressure-fed from an external is discharged through the first slot which is an opening of the die head configured as above and the insulator paste separately pressure-fed from the external is discharged from the second slot, so that the active material paste and the insulator paste are each applied to the strip-shaped electrode foil which is being fed by a backup roll. The shim is provided with a partition wall portion for separating the active material paste and the insulator paste (i.e., the first slot and the second slot). To avoid a defect such as deformation of the partition wall portion due to the force thereon deriving from the differential pressure, the magnitudes of the pressures to be applied to the active material paste and the insulator paste are often set to be approximately equal to each other.

On one hand, in consideration of the size of the first slot in the feeding direction ("feeding-direction size") perpendicular to the width direction and the weight per unit area of the active material paste to be discharged (i.e., the layer thickness of the active material layer), the selectable range of the pressure to be applied to the active material paste is often limited to a certain range.

On the other hand, if the pressure to be applied to the insulator paste is selected from such a limited range and further an appropriate amount of the insulator paste is to be discharged from the second slot having the feeding-direction size equal to the feeding-direction size of the first slot, the viscosity of the insulator paste is not appropriate (e.g. the viscosity is too low or inversely too high). This may cause difficulty in realizing the above method.

In the foregoing manufacturing method, in contrast, the feeding-direction size of the second slot in the die head is designed to be different from the feeding-direction size of the first slot. This enables appropriate discharging of each of the active material paste and the insulator paste with the viscosity suitable for each paste.

To be concrete, for example, in order to determine the feeding-direction size of the first slot and the feeding-direction size of the second slot in the die head, the shim to be interposed between the upstream-side head body and the downstream-side head body is manufactured by for example the following manufacturing method. This method includes removing a part of the shim from both surfaces by etching over the entire thickness of the shim to form the first slot and leaving a part on the one side in the thickness direction (the feeding direction) by half etching (one-side etching) to form the second slot. Accordingly, in the die head, the feeding-direction size of the second slot is smaller than the feeding-direction size of the first slot. As an alternative, to the contrary, a part of the shim to form the second slot is removed throughout the thickness of the shim, while a part of the shim to form the first slot is left on the one side in the thickness direction. Thus, the feeding-direction size of the second slot is larger than the feeding-direction size of the first slot.

Another method for manufacturing the shim using no half etching also may be adopted. In this method, the feeding-direction size of the second slot is designed to be different from the feeding-direction size of the first slot by for example forming grooves or protrusions in a lip portion of the upstream-side head body or the downstream-side head body. The above methods may be combined.

The feeding direction indicates a direction to feed an electrode foil (a subject to be coated) perpendicular to the width direction of a strip-shape electrode foil. The feeding-direction size of the first slot and the second slot indicates a size of the first slot and the second slot in the direction (i.e., the feeding direction of the electrode foil) perpendicular to the width direction.

In the forgoing strip-shaped electrode sheet manufacturing method, the insulator paste may be lower in viscosity than the active material paste, and the die head may be configured such that the size of the second slot in the feeding direction is smaller than the size of the first slot in the feeding direction.

As compared with the active material paste with a high amount of solid content, such as active material particles, the insulator paste is apt to be low in viscosity because the insulator paste is made with a low amount of solid content and a large amount of solvent. Thus, when the same pressure is applied to the insulator paste as the pressure applied to the active material paste to discharge the insulator paste from the second slot having the same feeding-direction size as the first slot, an appropriate amount of the insulator paste could not be discharged; for example, the amount of the insulator paste to be discharged from the second slot becomes too much.

In contrast, in the foregoing manufacturing method, the insulator paste is lower in viscosity than the active material paste; however, the feeding-direction size of the second slot is smaller than the feeding-direction size of the first slot. Thus, even when the same level of pressure as to the active material paste is applied to the insulator paste having a lower viscosity than the active material paste, the insulator paste can be discharged at an appropriate amount from the second slot.

In the forgoing strip-shaped electrode sheet manufacturing method, the die head may be configured such that a position of the second slot is biased to a downstream side in the feeding direction relative to a position of the first slot.

The configuration of the die head in which the feeding-direction size of the second slot is smaller than the feeding-direction size of the first slot may conceivably include a pattern (a) in which the center position of the second slot in the feeding direction is aligned with the center position of the first slot, a pattern (b) in which the position of the second slot is biased to an upstream side in the feeding direction relative to the position of the first slot, and a pattern (c) in which the position of the second slot is biased to a downstream side in the feeding direction relative to the position of the first slot.

In the patterns (a) and (b), as compared with the pattern (c), the active material paste and the insulator paste discharged from the die head take long to reach portions of the active material paste and the insulator paste which are being still pressurized between the downstream-side lip provided in the downstream-side head body of the die head and the electrode foil. Thus, the active material paste and the insulator paste each attempting to spread in the width direction are easy to contact with each other, so that they are liable to eddy and mix with each other at or near their interface.

In contrast, in the pattern (c), as compared with the patterns (a) and (b), the insulator paste is discharged later than the active material paste when viewed in the feeding direction. Thus, the undried active material layer and the undried insulator layer each attempting to spread in the width direction are less likely to contact with each other or are inhibited from strongly contacting with each other between a downstream-side lip portion of the die head and the electrode foil. This can prevent the undried active material layer and the undried insulator layer from eddying and mixing with each other at their interface.

Furthermore, another aspect of the present disclosure provides a method for manufacturing a rectangular electrode sheet comprising a longitudinal-direction cutting step of cutting the strip-shaped electrode sheet manufactured by the foregoing strip-shaped electrode sheet manufacturing method at a predetermined length in a longitudinal direction.

According to the above rectangular electrode sheet manufacturing method, the strip-shaped electrode sheet manufactured by one of the foregoing strip-shaped electrode sheet manufacturing methods has only to be cut at a predetermined length in the longitudinal direction. Thus, the rectangular electrode sheet can be manufactured easily and at low cost.

Still another aspect of the present disclosure provides a method for manufacturing a battery comprising an electrode body forming step of forming an electrode body from the strip-shaped electrode sheet manufactured by the foregoing strip-shaped electrode sheet manufacturing method or the rectangular electrode sheet manufactured by the foregoing rectangular electrode sheet manufacturing method.

According to the above battery manufacturing method, the electrode body is made of the foregoing strip-shaped electrode sheet or the rectangular electrode sheet. Thus, a battery can be manufactured easily at low cost.

Another aspect provides a die head including: a first slot extending straight in a width direction and configured to discharge first paste; a second slot located on one side in the width direction relative to the first slot at a predetermined distance, the second slot being narrower in the width direction than the first slot and configured to discharge second paste, wherein the die head further includes a passage configured to direct the second paste to the second slot, and the passage has a shape allowing the second paste to move toward the second slot and move toward an other side in the width direction.

Since the above die head includes the passage having the foregoing shape, the second paste (e.g. insulator paste) directed to the second slot through the passage is discharged from the second slot toward a subject to be coated (e.g. an electrode foil) so as to move toward the to-be-coated subject and toward the other side in the width direction.

The second paste discharged from the second slot of the die head and applied to the coated subject is easy to spread toward the other side in the width direction on the to-be-coated subject. Accordingly, in the die head, before discharging, the second paste never contacts and mixes with the first paste (e.g. active material paste) to be discharged from the first slot of the same die head and applied to the to-be-coated subject. On the other hand, the die head configured as above can facilitate approaching and contacting between the first and second pastes on the to-be-coated subject, even though the first and second pastes are discharged with the predetermined clearance from each other.

A concrete configuration of the foregoing die head may include for example the following configuration. The die head includes:

an upstream-side head body placed on an upstream side of the first slot and the second slot in a feeding direction;

a downstream-side head body placed on a downstream side of the first slot and the second slot in the feeding direction; and a shim having a flat plate shape and interposed between the upstream-side head body and the downstream-side head body and configured to determine a size in the feeding direction and a size in a width direction of each of the first slot and the second slot, wherein the shim includes a first passage portion to form a first passage for directing the first paste to the first slot and a second passage portion to form the second passage, the second passage portion being located closer to the other side in the width direction as it is nearer the second slot.

This die head has only to include the second passage portion of the shim configured as above and can achieve a simple configuration.

In the foregoing die head, the second slot may have a size in a feeding direction set different from a size of the first slot in the feeding direction.

The die head includes for example an upstream-side head body, a downstream-side head body, and a shim interposed between the upstream-side and downstream-side head bodies. Thus, the first paste pressure-fed from the external is discharged through the first slot defined by the above parts and the second paste pressure-fed from the external is discharged through the second slot to be applied to a subject to be coated. The shim is provided with a partition wall portion for separating the first paste and the second paste (i.e., the first slot and the second slot). To avoid a defect such as deformation of the partition wall portion due to the force thereon deriving from a differential pressure, the magnitudes of the pressures to be applied to the first paste and the second paste are often set to be approximately equal to each other.

On one hand, in consideration of the feeding-direction size of the first slot and the discharging amount of the first paste to be discharged from this first slot, the selectable range of the pressure to be applied to the first paste is often limited to a certain range.

On the other hand, if the second paste is to be discharged from the second slot having the same feeding-direction size as the first slot under the pressure falling within the limited range, the viscosity of the second paste is not appropriate (e.g. the viscosity is too low or inversely too high). This may cause difficulty in discharging an appropriate amount of the second paste.

In the foregoing die head, in contrast, the feeding-direction size of the second slot is designed to be different from the feeding-direction size of the first slot. Accordingly, even though the pressures to be applied to the first paste and the second paste are set to be approximately equal, the first paste and the second paste can be discharged at appropriate amounts according to respective viscosities different between the first paste and the second paste.

A concrete configuration of the foregoing die head may include for example the following configuration. The die head includes:

an upstream-side head body;

a downstream-side head body; and a shim interposed between the upstream-side head body and the downstream-side head body, wherein the shim includes a first opening to form a first slot and a second opening to form a second slot, either the first opening or the second opening is a penetrated opening in which a plate material forming the shim is absent throughout the thickness direction, and the other is an unpenetrated opening (i.e., a bottom-closed opening) in which a part of the plate material forming the shim is present in the thickness direction.

In the die head incorporating this shim, the first slot and the second slot can be designed with different thicknesses, i.e., different sizes in the feeding direction from each other.

In the foregoing die head, the size of the second slot in the feeding direction may be smaller than the size of the first slot in the feeding direction.

In some cases, the second paste to be discharged from the second slot may be lower in viscosity than the first paste to be discharged from the first slot. At that time, when the first slot and the second slot are equal in size in the feeding direction, if the pressure to be applied to the first paste is adjusted to discharge an appropriate amount of the first paste from the first slot and the same pressure is applied to the second paste as to the first paste, an appropriate amount of the second paste could not be discharged; for example, the amount of the second paste to be discharged from the second slot becomes too much.

In the foregoing die head, in contrast, the second slot is designed to be smaller in size in the feeding direction than the first slot. Thus, even when the same level of pressure as to the first paste is applied to the second paste having lower viscosity than the first paste, the die head can discharge the second paste appropriately from the second slot.

In the foregoing die head, a position of the second slot is biased to a downstream side in the feeding direction relative to a position of the first slot.

In the die head as described above in which the position of the second slot is biased to the downstream side in the feeding direction relative to the first slot, the second paste is discharged later than the first paste when viewed in the feeding direction, as compared with a die head in which the position of the second slot is biased to the upstream side in the feeding direction relative to the position of the first slot or a die head in which the central position of the second slot in the feeding direction is aligned with the central position of the first slot in the feeding direction. Therefore, this configuration can prevent the first paste and the second paste, each attempting to spread in the width direction, from strongly contacting with each other between the downstream-side lip of the die head and the to-be-coated subject, thereby relatively preventing the first paste and the second paste from eddying and mixing with each other near the interface.

BRIEF DESCRIPTION OF THE DRAWINGS

FIG. 1 is a perspective view of a battery in a first embodiment;

DETAILED DESCRIPTION OF THE EXEMPLARY EMBODIMENTS

First Embodiment

Figure 2:
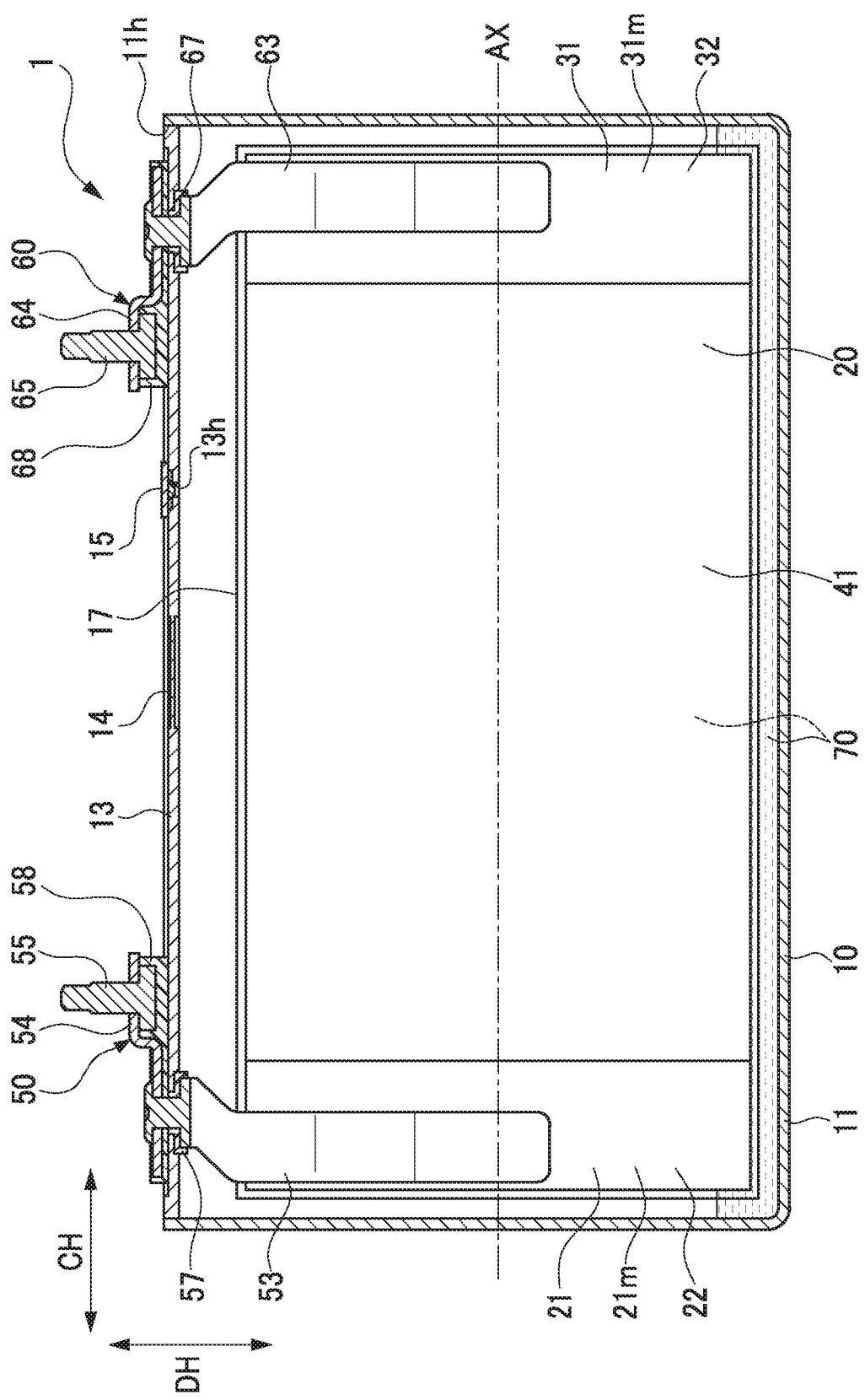
FIG. 2 is a vertical cross-sectional view of the battery in the first embodiment.
Figure 3:
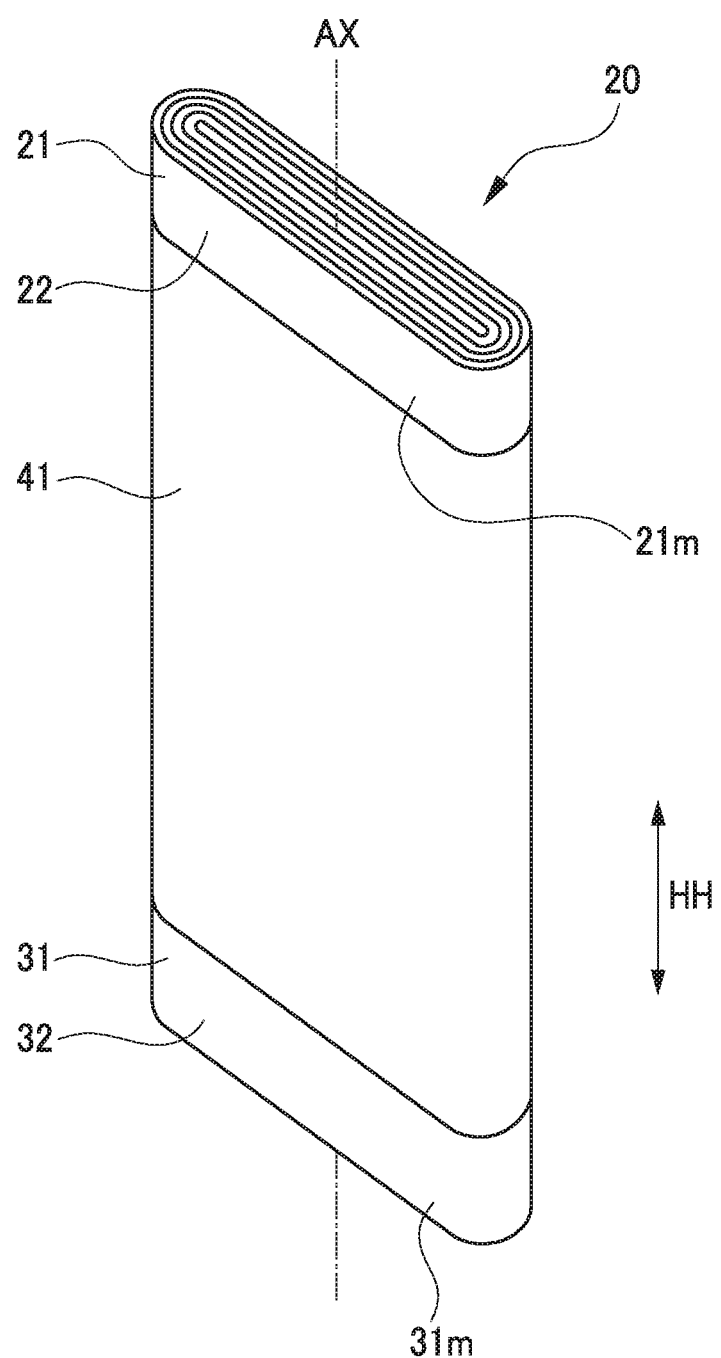
FIG. 3 is a perspective view of a would electrode body to be incorporated in the battery in the first embodiment.
Figure 4:
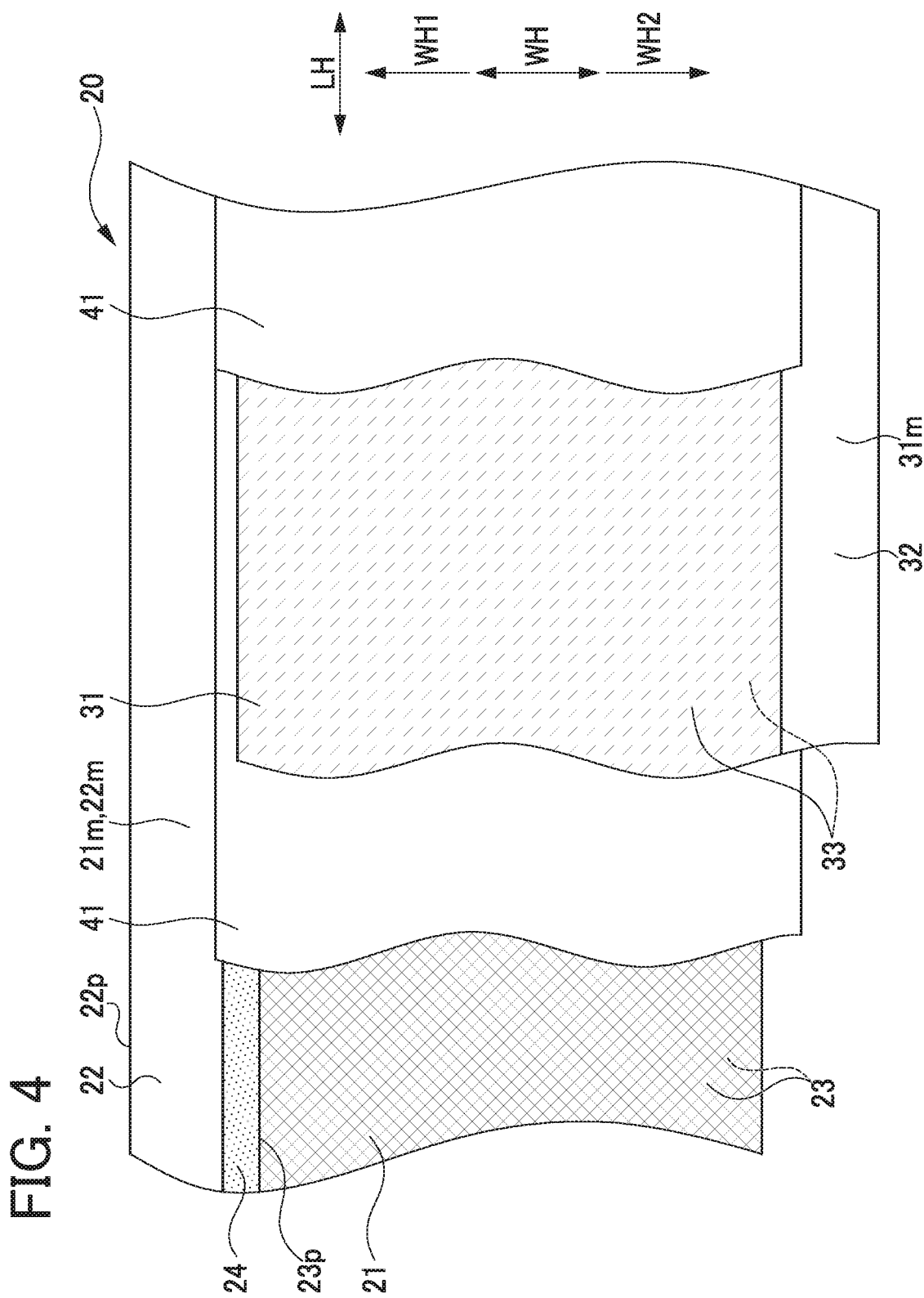
FIG. 4 is an exploded view of the electrode body in the first embodiment.

A detailed description of a first embodiment of this disclosure will now be given referring to the accompanying drawings. FIG. 1 is a perspective view of a lithium ion secondary battery (hereinafter, also simply referred to as a "battery") in the first embodiment and FIG. 2 is a vertical cross-sectional view of the same. FIG. 3 is a perspective view of an electrode body 20 of this battery 1 and FIG. 4 is an exploded view of the same.

In the following description, for the battery 1, the battery thickness direction BH, the battery lateral direction CH, and the battery vertical direction DH are defined as directions shown in FIGS. 1 and 2.

This battery 1 is a sealed lithium ion secondary battery having a rectangular cross-section which will be mounted in a vehicle, such as a hybrid vehicle and an electric vehicle. The battery 1 includes a battery case 10, a wound electrode body 20 housed therein, a positive terminal member 50 and a negative terminal member 60 each supported by the battery case 10, and others. The battery case 10 contains an electrolyte (a nonaqueous electrolyte) 70 so that a part of the electrolyte 70 is impregnated in the electrode body 20 and the remainder stays as excess liquid in the bottom of the battery case 10.

The battery case 10 is made of metal (aluminum in the present embodiment) having a parallelepiped box-like shape. This battery case 10 includes a case body member 11 having a bottom-closed rectangular tube shape, only an upper end of which is open, and a case lid member 13 having a rectangular plate shape welded to the case body member 11 to close the upper end, or an opening 11h, of the case body member 11. The case lid member 13 is provided with a safety valve 14 configured to fracture and open when the inner pressure of the battery case 10 reaches a predetermined pressure. This case lid member 13 is formed with a liquid port 13h providing communication between the inside and the outside of the battery case 10. This liquid port 13h is hermetically sealed with a seal member 15.

To the case lid member 13, the positive terminal member 50 is fixedly attached through an inner insulation member 57 and an outer insulation member 58 each of which is made of resin. The positive terminal member 50 includes an inner terminal member 53, an outer terminal member 54, and a bolt 55, each of which is made of aluminum. In the battery case 10, the inner terminal member 53 forming one end of the positive terminal member 50 is welded and electrically conducted to a positive current collecting part 21m, mentioned later, of the positive electrode sheet 21 of the electrode body 20. Further, the inner terminal member 53 extends out of the battery case 10 through the case lid member 13 and is connected to the outer terminal member 54 forming the other end of the positive terminal member 50 and the bolt 55.

To the case lid member 13, furthermore, the negative terminal member 60 is fixedly attached through an inner insulation member 67 and an outer insulation member 68 each made of resin. The negative terminal member 60 includes an inner terminal member 63, an outer terminal member 64, and a bolt 65, each of which is made of copper. The inner terminal member 63 forming one end of the negative terminal member 60 is welded and electrically connected to a negative current collecting part 31m, mentioned later, of the negative electrode sheet 31 of the electrode body 20. Further, the inner terminal member 63 extends out of the battery case 10 through the case lid member 13 and is connected to the outer terminal member 64 forming the other end of the negative terminal member 60 and the bolt 65.

Next, the electrode body 20 will be described referring to FIGS. 2 to 4. This electrode body 20 has a flat shape in cross section and is accommodated in the battery case 10 such that the electrode body 20 is oriented sideways with its axis AX extending in parallel with the battery lateral direction CH. Between the electrode body 20 and the battery case 10, there is placed a sac-like insulative film envelop 17 made of an insulation film having an opening at one end (i.e., an upper end in FIG. 2) to insulate between the electrode body 20 and the battery case 10. The electrode body 20 is formed of a strip-shaped positive electrode sheet 21 and a strip-shaped negative electrode sheet 31 that overlap in layers by interposing therebetween a pair of strip-shaped separators 41 one by one (see FIG. 4) and wound around the axis AX and compressed into a flat shape (see FIG. 3).

On each surface of the strip-shaped negative current collecting foil 32 made of copper, in a region corresponding to a part on one side in the width direction ("width-direction one side") WH1 (an upper side in FIG. 4) and extending in a longitudinal direction LH, the strip-shaped negative electrode sheet 31 (see FIG. 4) is provided with a negative active material layer 33 in a strip-shaped area. In contrast, the end portion of the negative electrode sheet 31 on the other side in the width direction ("width-direction other side") WH2 forms a negative current collecting part 31m in which the negative active material layer 33 does not exist in the thickness direction TH and thus the negative current collecting foil 32 is exposed. The aforementioned inner terminal member 63 of the negative terminal member 60 is welded to this negative current collecting part 31m.

The negative active material layer 33 contains negative active material particles, a binder, and a thickener. In the present embodiment, graphite particles are used as the negative active material particles and styrene-butadiene rubber (SBR) is used as the binder.

Each of the strip-shaped separators 41 is a porous film in a three-layer structure formed in such a manner that one porous resin film made of polyethylene (PE) is sandwiched between two porous resin films made of polypropylene (PP) in layers.

The strip-shaped positive electrode sheet 21 is provided with a strip-shaped positive current collecting foil 22 made of an aluminum foil extending in the longitudinal direction LH, and a strip-shapes positive active material layer 23 containing positive active material particles 23f and others and a strip-shaped insulator layer 24 made of insulating resin and others so that those layers 23 and 24 are formed on both surfaces 22S1 and 22S2 of the positive current collecting foil 22.

Figure 5:
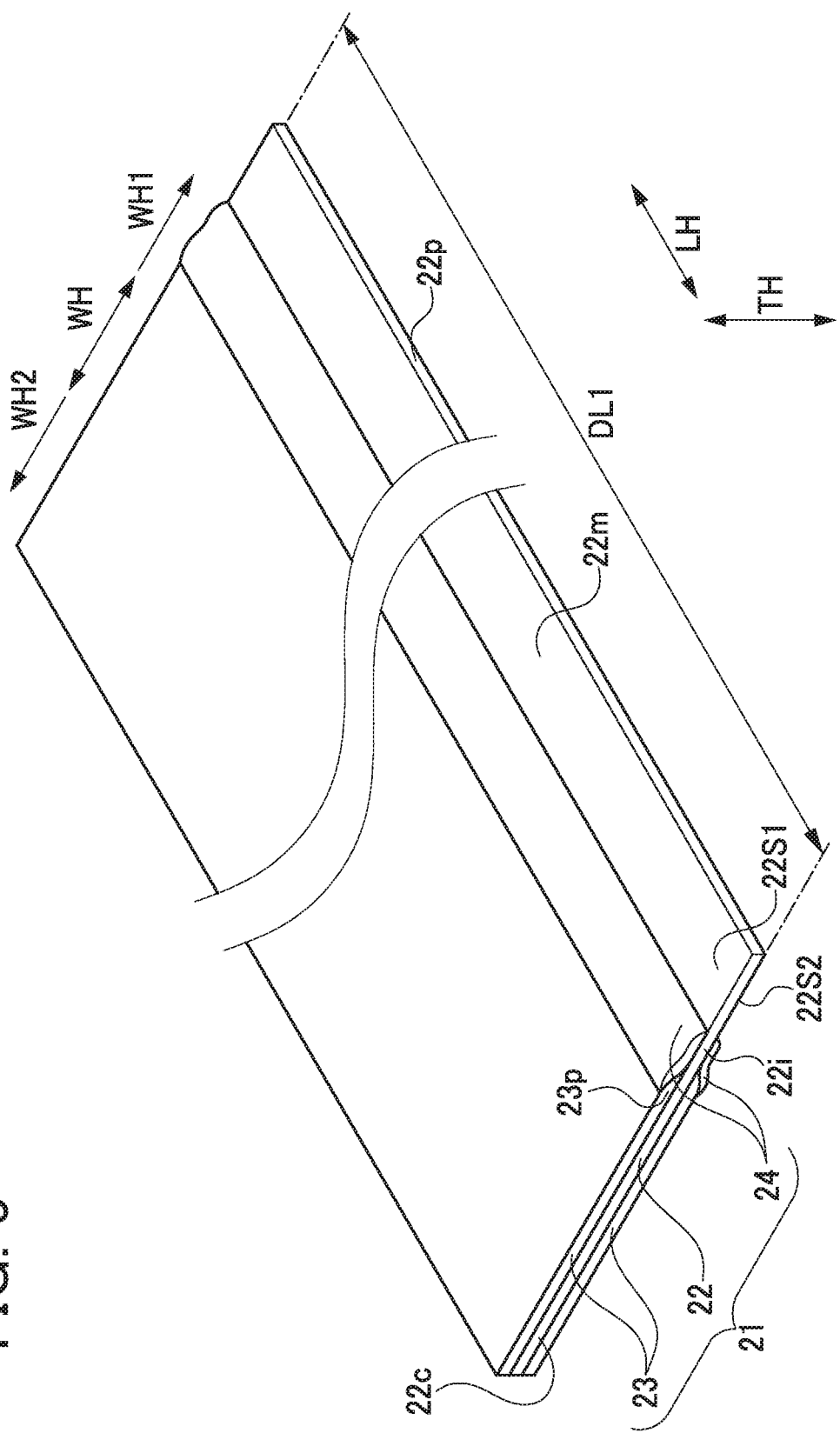
FIG. 5 is a perspective view of a positive electrode sheet in the first embodiment.

The strip-shaped positive current collecting foil 22 includes a one-side foil edge 22p on the width-direction one side WH1 of the positive current collecting foil 22 (i.e., an upper side in FIG. 4 and a right lower side in FIG. 5) and further a strip-shaped foil exposed portion 22m extending along the one-side foil edge 22p in the longitudinal direction LH, in which the positive current collecting foil 22 itself is exposed. In the positive electrode sheet 21, the foil exposed portion 22m corresponds to the positive current collecting part 21m electrically connected to the inner terminal member 51 of the positive terminal member 50. The inner terminal member 53 of the positive terminal member 50 is welded to the positive current collecting part 21m (i.e., the foil exposed portion 22m).

The strip-shaped positive active material layer 23 is formed on each of the surfaces 22S1 and 22S2 of the positive current collecting foil 22, concretely, on an active-material-layer support portion 22c located to the width-direction other side WH2 relative to the foil exposed portion 22m. In the positive active material layer 23, a positive electrode layer edge portion 23p located on the width-direction one side WH1 includes a positive electrode layer slant portion (also simply referred to as a "slant portion") 23ps in which the positive active material layer 23 is smaller in thickness (corresponding to the size in the thickness direction TH) as closer to the width-direction one side WH1 (see FIG. 6). This positive active material layer 23 contains positive active material particles, a conductive material, and a binder. In the first embodiment, lithium transition metal composite oxide particles (concretely, lithium nickel cobalt manganese oxide) are used as the positive active material particles 23f, acetylene black is used as the conductive material, and polyvinylidene fluoride (PVDF) is used as the binder.

Figure 6:
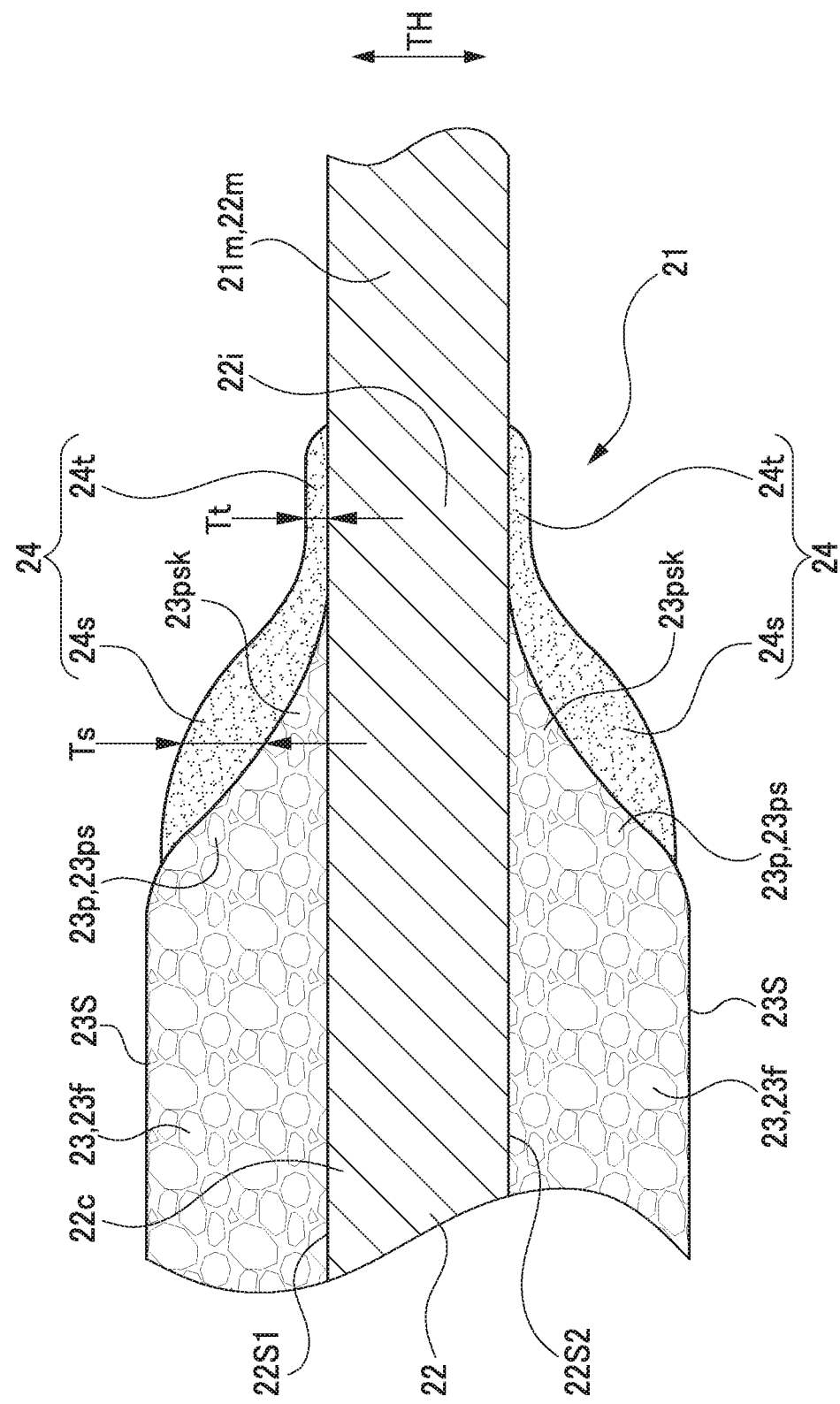
FIG. 6 is a partially-enlarged cross-sectional view showing the configurations of a one-side layer edge portion of a positive active material layer and an insulator layer in a positive electrode sheet in the first embodiment and a rectangular positive electrode sheet in a second embodiment.

On the other hand, the strip-shaped insulator layer 24 is formed on an insulator-layer support portion 22i of the positive current collecting foil 22, this support portion 22i being located between the foil exposed portion 22m and the active-material-layer support portion 22c, such that the insulator layer 24 extends along the positive electrode layer edge portion 23p of the positive active material layer 23, this edge portion 23p being located on the width-direction one side WH1, and extends in the longitudinal direction LH (see FIG. 6). The insulator layer 24 is also located so as to be entirely covered by the separators 41 (see FIG. 4). This insulator layer 24 is positioned lower toward the positive current collecting foil 22 than a top face 23S of the positive active material layer 23. In other words, the insulator layer 24 is placed closer to the positive current collecting foil 22 relative to the top face 23S when viewed in the thickness direction TH of the positive electrode sheet 21.

Thus, as compared with a configuration that the insulator layer 24 of the positive electrode sheet 21 is located higher than the top face 23S of the positive active material layer 23, the insulator layer 24 of the positive electrode sheet 21 in the first embodiment enables the positive electrode sheet 21 to be appropriately wound up by itself or wound together with the negative electrode sheet 31 and the separators 41 to produce the wound electrode body 20. When the wound electrode body 20 is manufactured by use of this positive electrode sheet 21 and the contact pressure is applied to the top face 23S of the positive active material layer 23, the top face 23S of the positive active material layer 23 can be entirely uniformly subjected to the pressure.

Furthermore, as shown in FIG. 6, the insulator layer 24 includes a slant coating portion 24s that covers at least a lower portion 23psk of the slant portion 23ps of the positive active material layer 23, and a foil coating portion 24t that extends from the slant coating portion 24s in the width-direction one side WH1 and covers the insulator-layer support portion 22i of the positive current collecting foil 22.

Thus, the slant coating portion 24s can insulate the lower portion 23psk of the slant portion 23ps of the positive active material layer 23 and additionally the foil coating portion 24t can cover and insulate the insulator-layer support portion 22i of the positive current collecting foil 22. Since the foil coating portion 24t continuously extends from the slant coating portion 24s, no gap is left between the insulator layer 24 and the positive active material layer 23, thereby enabling to reduce a risk that conductive foreign substances may be caught in the gap.

The insulator layer 24 includes insulating resin (e.g., PVDF in the first embodiment). The insulator layer 24 further contains inorganic insulation powder (concretely, boehmite powder). Accordingly, even if a micro short-circuit occurs and the surrounding area of the insulator layer 24 is exposed to high temperature, the insulator layer 24 can function as an HRL (a heat resisting layer) that the inorganic insulation powder (boehmite powder and others) maintains insulation.

Meanwhile, the slant portion 23ps of the positive active material layer 23 is not so smooth with asperities as compared with the insulator-layer support portion 22i of the positive current collecting foil 22. Thus, if the thickness Ts of the slant coating portion 24s of the insulator layer 24 is equal to or thinner than the thickness Tt of the foil coating portion 24t (Ts Tt), the slant coating portion 24s can only cover and insulate the slant portion 23ps of the positive active material layer 23 with low reliability.

In contrast, as shown in FIG. 6, in the positive electrode sheet 21 in the first embodiment, the thickness Ts of the slant coating portion 24s of the insulator layer 24 is designed to be thicker than the thickness Tt of the foil coating portion 24t (Ts Tt). Accordingly, the slant coating portion 24s of the insulator layer 24 can cover and insulate the slant portion 23ps of the positive active material layer 23 with higher reliability than in the above case.

As described later, when the strength and the timing of impact caused when the undried positive active material layer 23M and the undried insulator layer 24M contact with each other are set in an appropriate relationship, the slant coating portion 24s and the foil coating portion 24t of the insulator layer 24 are formed with respective thicknesses Ts and Tt meeting the aforementioned relationship (Ts>Tt).

In the positive electrode sheet 21 of the battery 1 in the first embodiment, the positive active material layer 23 contains the positive active material particles 23f made of metal oxide. To be concrete, it contains the positive active material particles 23f made of lithium transition metal composite oxide, more concretely, lithium nickel cobalt manganese oxide.

For the negative electrode sheet 31, graphite particles are used as negative active material particles which exhibit relatively low resistance. Therefore, the negative active material layer 33 is lower in resistance than the positive active material layer 23. Thus, a short-circuit formed by conductive foreign substances between the negative active material layer 33 containing graphite particles exhibiting relatively low resistance and the positive current collecting foil 22 of the positive electrode sheet 21 is lower in resistance than a short-circuit formed by conductive foreign substances and others between the positive active material layer 23 and the negative electrode sheet 31 (the negative active material layer 33 or the negative current collecting foil 32). This may cause a particularly undesirable result that a large amount of current to flow through such a short-circuit.

In contrast, in the first embodiment, the positive current collecting foil 22 is provided with the insulator layer 24, which can prevent a short-circuit between the positive current collecting foil 22 and the negative electrode sheet 31 (the negative active material layer 33 or the negative current collecting foil 32).

Figure 8:
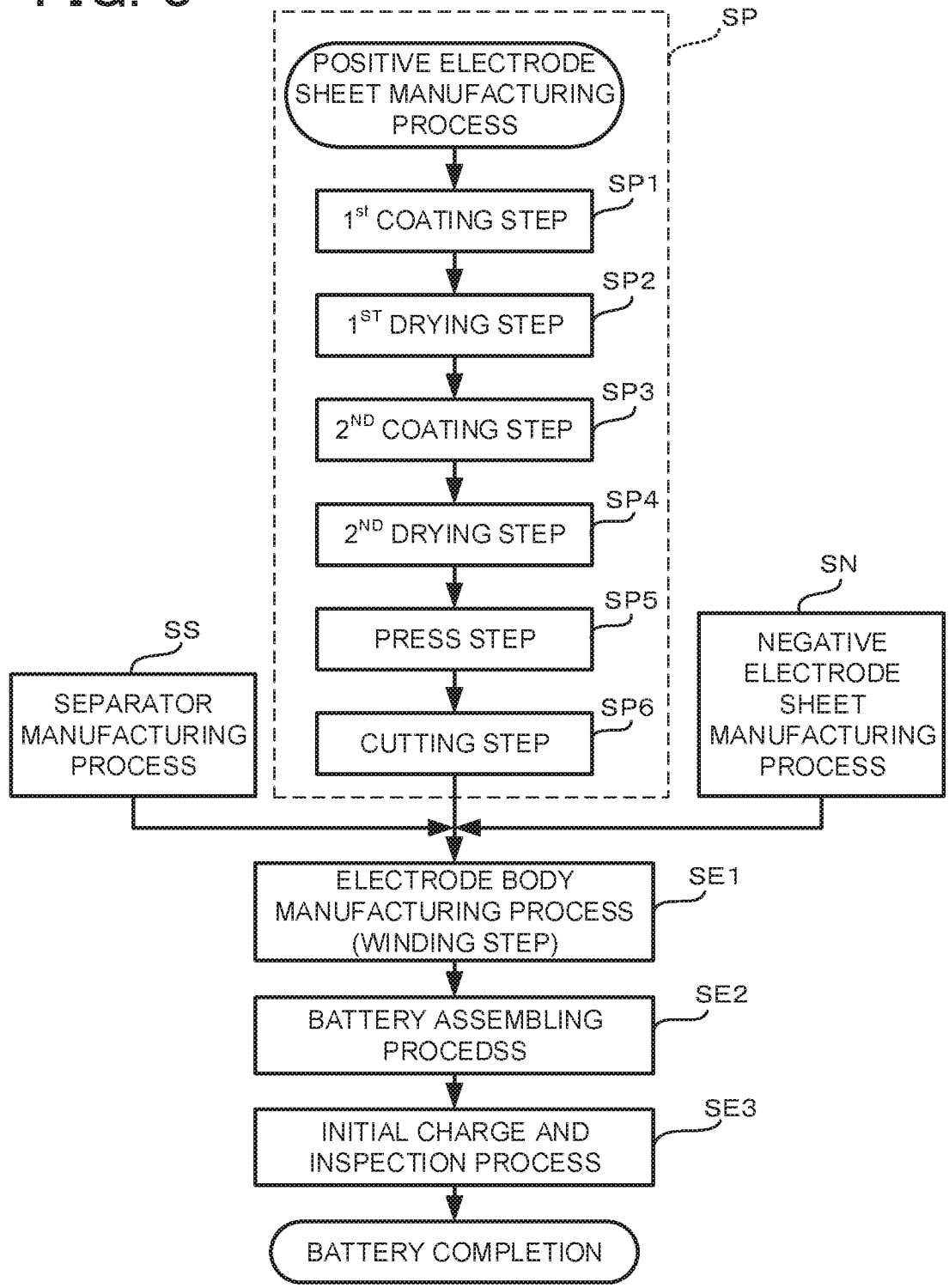
FIG. 8 is a flowchart showing a process sequence for manufacturing the battery in the first and second embodiments.

Next, the following explanation is made on the method for manufacturing the positive electrode sheet 21, the electrode body 20 incorporating this positive electrode sheet 21, and the battery 1 incorporating this electrode body 20 in the first embodiment (see FIG. 8).

The positive electrode sheet manufacturing process SP for obtaining the strip-shaped positive electrode sheet 21 having a predetermined length DL1 in the longitudinal direction (hereinafter referred to as a longitudinal-direction length DL1) will be first described below. Positive active material paste PAP and insulator paste IP are prepared. The positive active material paste PAP contains positive active material particles (e.g., lithium nickel cobalt manganese oxide particles) 23f, a conducive material (acetylene black), and a binder (PVDF). The positive active material paste PAP is produced by mixing and kneading these materials together with a solvent (N-methyl pyrrolidone (NMP)). On the other hand, the insulator paste IP contains insulating resin (e.g., PVDF in the present embodiment) and inorganic insulation powder (e.g., boehmite powder in the present embodiment). The insulator paste IP is produced by mixing and kneading these materials together with solvent (N-methyl pyrrolidone (NMP)). The positive active material paste PAP has a high solid content ratio NV and high viscosity. In contrast, the insulator paste IP has a smaller solid content ratio NV and lower viscosity than the foregoing positive active material paste PAP.

Figure 9:
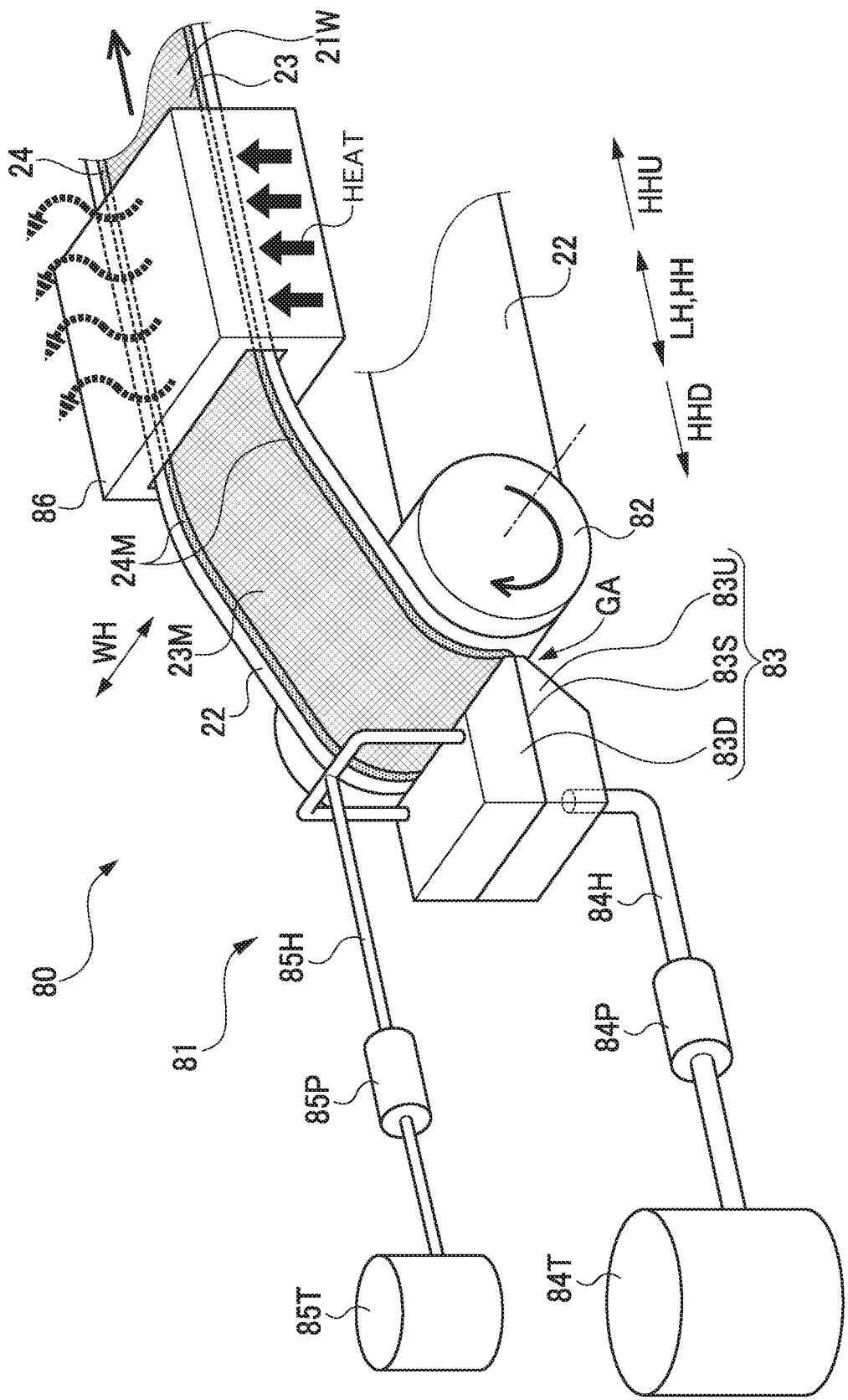
FIG. 9 is an explanatory view showing a manner of forming a positive active material layer and an insulator layer on a positive electrode foil by use of a die coater and a dryer in the first and second embodiments.
Figure 10:
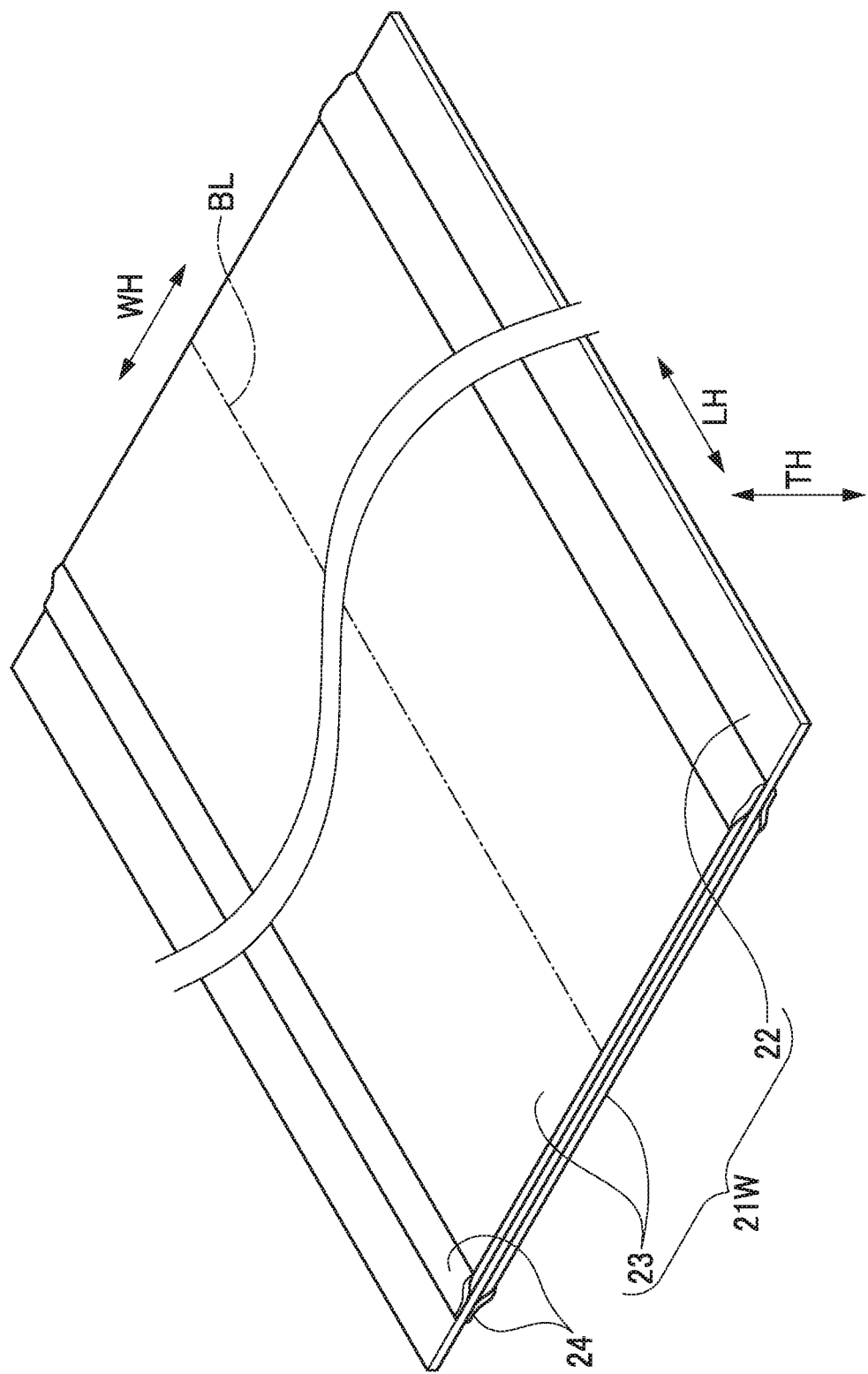
FIG. 10 is a perspective view of a positive electrode sheet before being cut in the first and second embodiments.

In the first embodiment, in the positive electrode sheet manufacturing process SP, using a die coater 81 of a coating-drying apparatus 80 shown in FIG. 9, the positive active material paste PAP and the insulator paste IP are applied to one surface 22S1 of the positive current collecting foil 22 to form an undried positive active material layer 23M and an undried insulator layer 24M (First coating step SP1). Those undried layers 23M and 24M are then dried by hot air in a dryer 86 to form a positive active material layer 23 and an insulator layer 24 (First drying step SP2). Successively, the same positive active material paste PAP and insulator paste IP are applied to the other surface 22S2 of the positive current collecting foil 22 to form an undried positive active material layer 23M and an undried insulator layer 24M (Second coating step SP3). Furthermore, those undried layers 23M and 24M are dried by hot air in the dryer 86 to form a positive active material layer 23 and an insulator layer 24 (Second drying step SP4). Thus, an uncut, wider positive electrode sheet 21W (see FIG. 10) is produced. Subsequently, this uncut positive electrode sheet 21W is compressed by a roll press (not shown) for compaction of the positive active material layers 23 (Press step SP5). Furthermore, the uncut positive electrode sheet 21W is cut along an imaginary cutting line BL, i.e., in half, and further cut at a predetermined length in the longitudinal direction LH (Cutting step SP6). A finished positive electrode sheet 21 is thus obtained (see FIG. 5).

The die coater 81 used in the foregoing first and second coating steps SP1 and SP3 includes, as shown in FIG. 9, a backup roll 82 configured to feed the positive current collecting foil 22 wound therearound, and a die head 83 configured to discharge the positive active material paste PAP and the insulator paste IP toward the positive current collecting foil 22 opposed to the die head 83 with a gap GA therebetween to apply the undried positive active material layer 23M and the undried insulator layer 24M to the positive current collecting foil 22. The strip-shaped positive current collecting foil 22 is fed with its longitudinal direction LH corresponding to a feeding direction HH by rotation of the backup roll 82. Herein, an upstream side in the feeding direction HH is referred to as a feeding-direction upstream side HHU and a downstream side in the feeding direction HH is referred to as a feeding-direction downstream side HHD (see FIG. 9).

The die head 83 is supplied with the positive active material paste (a first paste) PAP from a first paste tank 84T through a first pipe 84H by a first pressure-feed pump 84P that pressurizes the first paste. The die head 83 is also supplied with the insulator paste (a second paste) IP from a second paste tank 85T through a second pipe 85H by a second pressure-feed pump 85P that pressurizes the second paste (see FIG. 9).

The die head 83 (see FIGS. 11 to 13) includes a first slot 83S1 extending in a straight line in a width direction WH and having a size in the width direction ("width-direction size") DW1 to discharge the positive active material paste (the first paste) PAP. On an outside in the width direction ("width-direction outside") WHO of the first slot 83S1 (i.e., the width-direction one side WH1 and the width-direction other side WH2 relative to the first slot 83S1), a pair of second slots 83S2 are also provided to discharge the insulator paste IP. Each of the second slots 83S2 is arranged at a predetermined distance DD from the first slot 83S1 and has a width-direction size DW2 narrower than the first slot 83S1 (DW2<DW1).

The die head 83 includes an upstream-side head body 83U located on the feeding-direction upstream side HHU, a downstream-side head body 83D located on the feeding-direction downstream side HHD relative to the upstream-side head body 83, and a shim 831 made of a stainless steel plate formed into a predetermined shape by etching. During use, the shim 831 is sandwiched between the upstream-side head body 83U and the downstream-side head body 83D. Thus, the shim 831 defines the width-direction sizes DW1 and DW2 and the feeding-direction sizes DH1 and DH2 of the first slot 83S1 and the second slot 83S2.

The upstream-side head body 83U and the downstream-side head body 83D are respectively formed with an upstream-side manifold part 83UM and a downstream-side manifold part 83DM each formed as a semicircular column-shaped hollow. They overlap each other by through a recessed manifold part 83IM penetrating through the shim 831 to form a nearly columnar manifold 83M in the die head 83. This manifold 83M is connected to the first pipe 84H through a first inflow port 83UP formed through the upstream-side head body 83U. The positive active material paste PAP pressure-fed through the first pipe 84H is stored temporarily in the manifold 83M. This positive active material paste PAP pressure-fed and stored in the manifold 83M is then pressure-fed toward the first slot 83S1 which is an opening of the die head 83 through a first passage 83T1 defined by an upstream-side flat part 83UT of the upstream-side head body 83U, a downstream-side flat part 83DT of the downstream-side head body 83D, and a first passage portion 831T1 of the shim 831. The positive active material paste PAP is discharged from the first slot 83S1 toward the positive current collecting foil 22 being fed by the backup roll 82 and opposed to the first slot 83S1. The positive active material paste PAP applied to the positive current collecting foil 22 forms a strip-shaped undried positive active material layer 23M.

On the other hand, the downstream-side head body 83D includes a pair of inflow ports 83DP each formed through the downstream-side head body 83D and connected to the second pipe 85H to supply the insulator paste IP pressure-fed through the second pipe 85H to the die head 83. The shim 831 includes a second passage portion 83IT2 having a bend in a crank-like shape on each width-direction outside WHO, i.e., the one side WH1 and the other side WH2 in the width direction, relative to the first passage portion 83IT1 separated by a partition wall portion 83IK. An end of each second passage portion 83IT2, opposite the second slot 83S2, is located at a position overlapping the corresponding second inflow port 83DP. Thus, the insulator paste IP flowing in the die head 83 through the second inflow port 83DP is pressure-fed toward the second slot 83S2 which is an opening of the die head 83 through a second passage 83T2 defined by the upstream-side flat part 83UT of the upstream-side head body 83U, the downstream-side flat part 83DT of the downstream-side head body 83D, and the second passage portion 83IT2 of the shim 831. This insulator paste IP is discharged from the second slot 83S2 toward the positive current collecting foil 22 opposed thereto. The insulator paste IP applied to the positive current collecting foil 22 forms a strip-shaped undried insulator layer 24M.

In the first embodiment, as shown in FIGS. 11 to 14, the second passages 83T2 and the second passage portions 83IT2 of the shim 831 forming the second passages 83T2 are configured to allow the insulator paste IP to move toward the second slot 83S2 and also move toward an inside in the width direction ("width-direction inside") WHI, i.e., the width-direction other side WH2 or the width-direction one side WH1 to approach the first passage 83T1 or the first passage portion 83IT1 of the shim 831. Concretely, of each crank-shaped second passage portion 83IT2 formed in the shim 831, a front end portion 83IT2S extending along the partition wall portion 83IK to the second slot 83S2 is configured to be located toward the width-direction inside WHI (in FIGS. 11 and 12, toward the width-direction other side WH2 for the right upper second passage 83T2 (the second passage portion 83IT2) or toward the width-direction one side WH1 for the left lower second passage 83T2 (the second passage portion 83IT2), and leftward in FIG. 14) as it extends forward FH (toward the right lower side in FIGS. 11 and 12 and toward the lower side in FIG. 14), that is, as it is closer to the second slot 83S2. Specifically, the front end portion 83T2S of the second passage 83T2, that is, the front end portion 83IT2S of the second passage portion 83IT2 is configured to be inclined, i.e., oblique, not perpendicular, with respect to the second slot 83S2.

Figure 14:
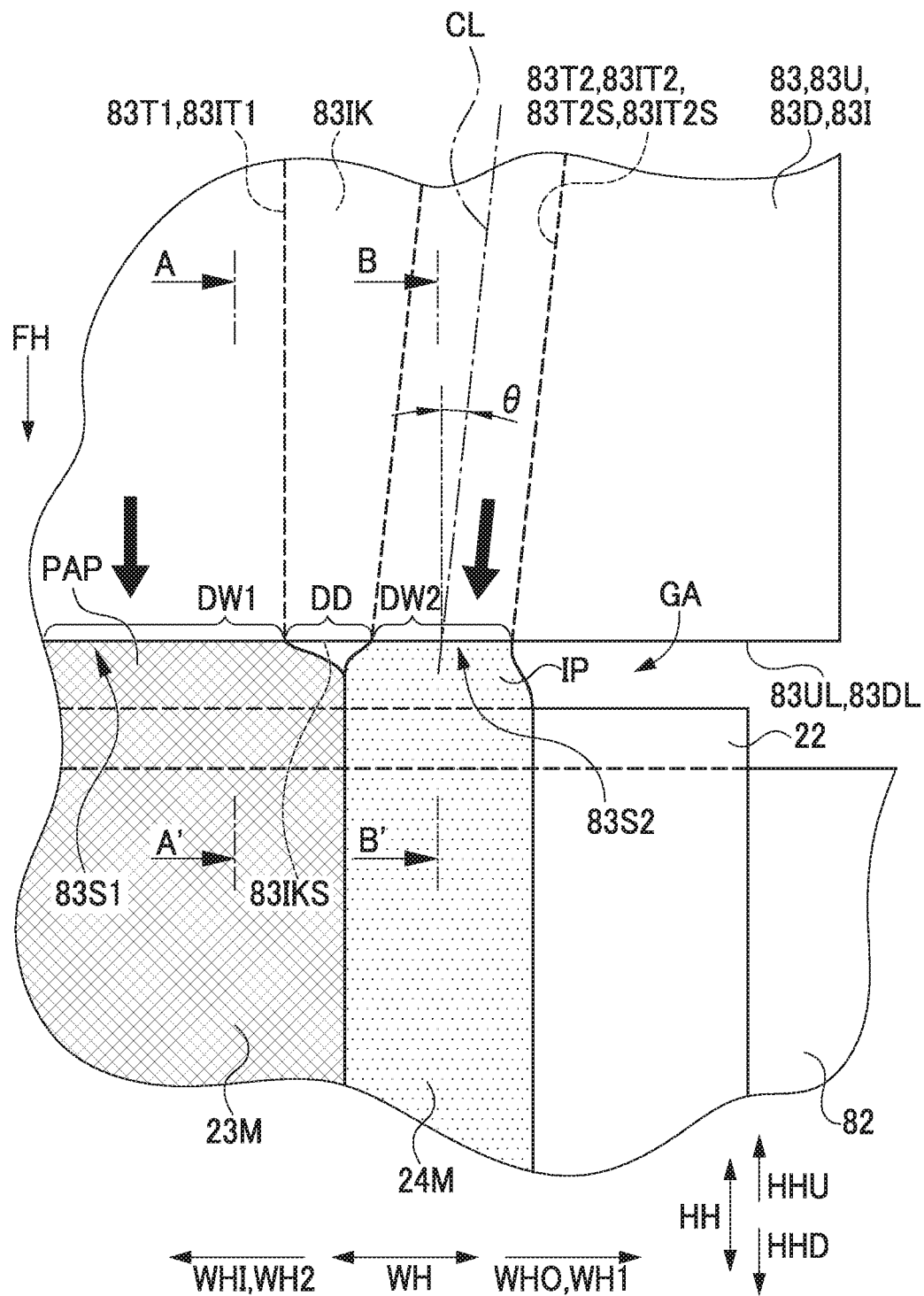
FIG. 14 is a partially-enlarged explanatory view showing an enlarged diagram of a manner of applying the active material paste and the insulator paste discharged from the die head to the positive current collecting foil, near a second slot, in FIG. 13 in the first and second embodiments.

In the first embodiment, as shown in FIG. 14, the inclination angle θ of the center line CL of the front end portion 83IT2S of the second passage portion 83IT2 of this shim 831 is 25°.

Figure 15:
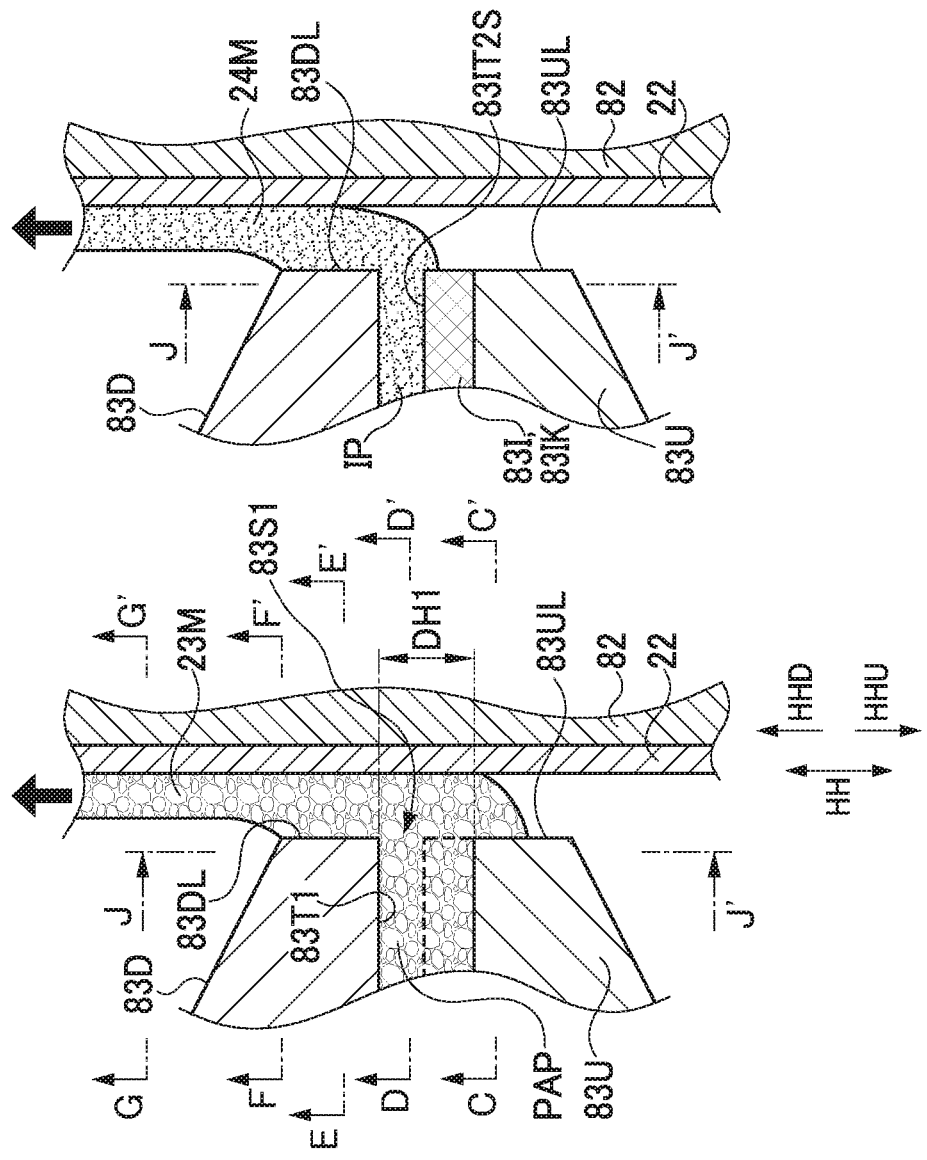
FIGS. 15A to 15C are explanatory views showing behaviors of the active material paste and the insulator paste discharged from the die head in the first and second embodiments, FIG. 15A showing behaviors of the active material paste and the insulator paste viewed from an upstream-side lip portion and a downstream-side lip portion, that is, taken in a J-J' in FIGS. 15B and 15C, FIG. 15B showing behaviors of the active material paste taken in an A-A' in FIGS. 15A and 14, and FIG. 15C showing behaviors the insulator paste taken in a B-B' in FIGS. 15A and 14.

A front end 83IKS of the partition wall portion 83IK of the shim 831 is positioned flush with, that is, not retracted behind, an upstream-side lip portion 83UL of the upstream-side head body 83U and a downstream-side lip portion 83DL of the downstream-side head body 83D (a retraction distance HS=0) (see FIG. 15C). Thus, the positive active material paste PAP and the insulator paste IP never mix with each other within the die head 83.

The above configuration can discharge the insulator paste IP from the second slots 83S2 toward the positive current collecting foil 22 opposed thereto and at the inclination angle θ toward the width-direction inside WHI, i.e., toward the width-direction other side WH2 or the width-direction one side WH1, that is, in a direction to approach the first slot 83S1. Each undried insulator layer 24M discharged at the inclination angle θ and applied to the positive current collecting foil 22 is easy to spread toward the width-direction inside WHI on the positive current collecting foil 22. The thus configured die head 83 in the first embodiment can make it easy for the undried positive active material layer 23M and each undried insulator layer 24M to contact with each other on the positive current collecting foil 22, even though the first slot 83S1 and each second slot 83S2 are separated at the distance DD by each partition wall portion 83IK of the shim 831. In other word, in this die head 83, before discharging, the insulator paste IP does not contact or mix with the positive active material paste PAP to be discharged from the first slot 83S1 and applied to the positive current collecting foil 22; however, even though the die head 83 discharges the insulator paste IP and the positive active material paste PAP at the predetermined distance DD during discharging, the die head 83 enables the undried positive active material layer 23M and the undried insulator layers 24M after application on the foil 22 to contact with each other on the foil 22.

In the first embodiment, the first pressure-feed pump 84P and the second pressure-feed pump 85P are adjusted so that the pressures to be applied to the positive active material paste PAP and the insulator paste IP which are discharged in parallel from both sides of each partition wall portion 83IK of the shim 831 are approximately equal to each other. If the pressures applied on the positive active material paste PAP and the insulator paste IP are different from each other, a stress due to a differential pressure is applied on the partition wall portion 83IK, resulting in deformation of the partition wall portion 83IK or variations in width-direction size DW1 of the first slot 83S1 or width-direction size DW2 of the second slot 83S2.

On one hand, in consideration of the feeding-direction size DH1 of the first slot 83S1 and the weight per unit area of the positive active material paste PAP to be discharged, i.e., a film thickness of the positive active material layer 23 to be formed, the range of selectable pressure to be applied to the positive active material paste PAP is limited to a certain range.

On the other hand, if the pressure to be applied to the insulator paste IP is also selected from such a limited range and the insulator paste IP is to be discharged from the second slot 83S2 having the feeding-direction size DH2 equal to the feeding-direction size of the first slot 83S1 (DH2=DH1), the viscosity of the insulator paste IP is not appropriate (e.g., too low or too high) and thus an appropriate amount of the insulator paste IP could not be discharged. In conformity to the first embodiment, in which the viscosity of the insulator paste IP is low, if the pressure to be applied to the insulator paste IP is equal to the pressure to be applied to the positive active material paste PAP, too much amount of the insulator paste IP may be discharged from the second slot 83S2.

Figure 11:
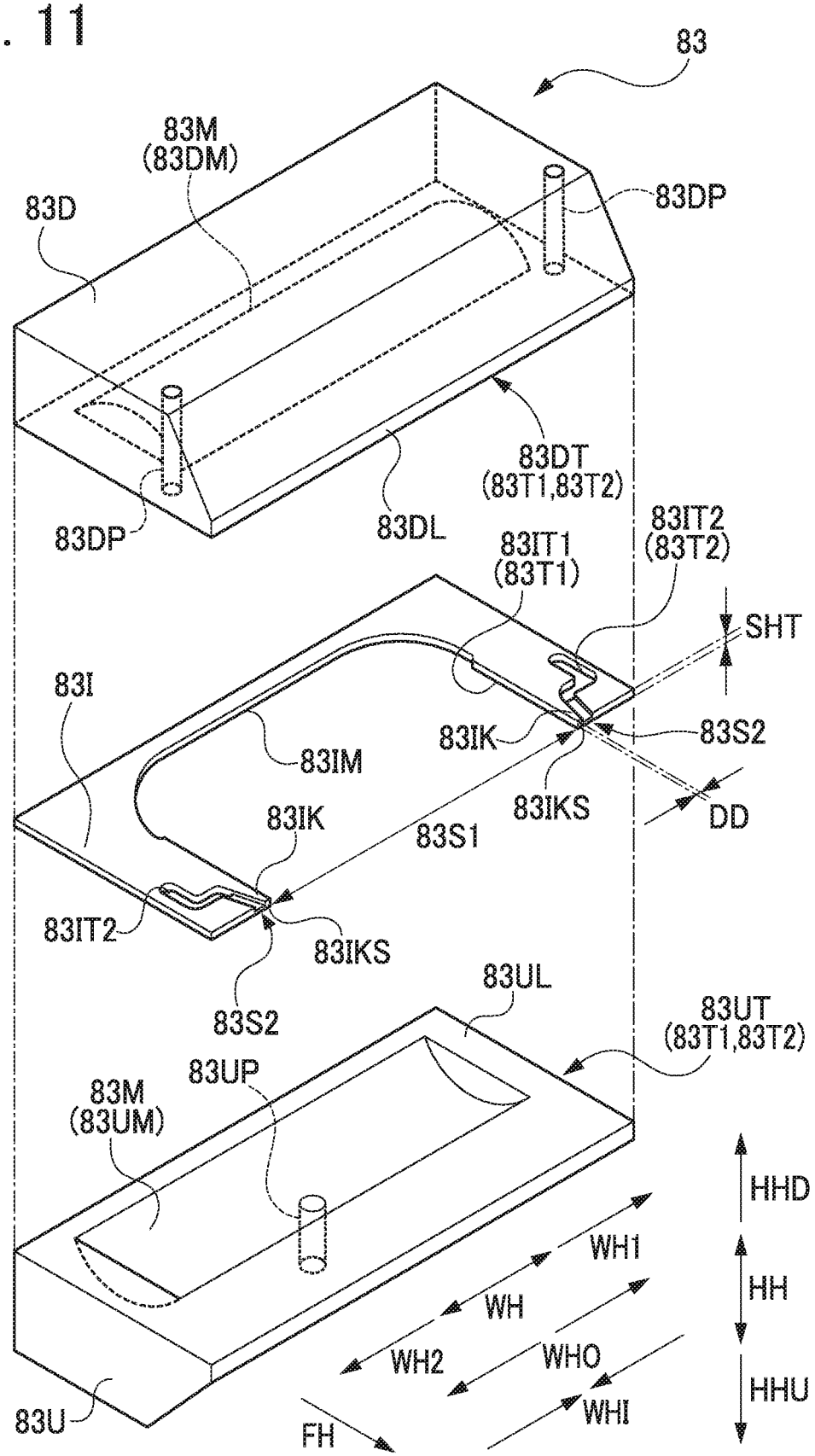
FIG. 11 is an exploded perspective view showing the configuration of a die head in the first and second embodiments.
Figure 12:
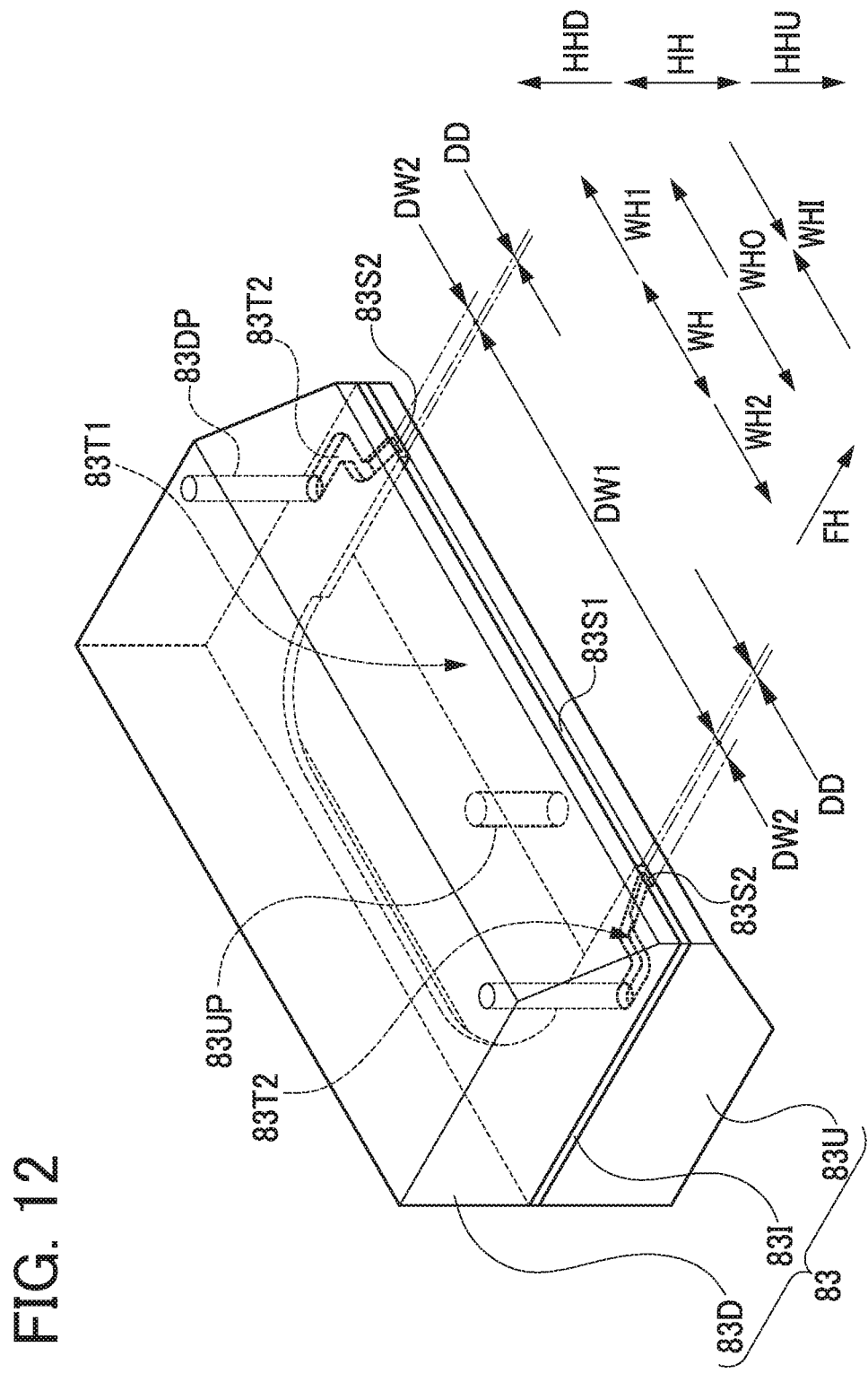
FIG. 12 is a perspective view showing the configuration of the die head in the first and second embodiments.

In the first embodiment, therefore, the feeding-direction size DH2 of each second slot 83S is set different from the feeding-direction size DH1 of the first slot 83S1 (DH2≠DH1). To be concrete, in consideration of the lower viscosity of the insulator paste IP than the positive active material paste PAP, as shown in FIG. 11 (also see FIGS. 15A and 15C), in the crank-shaped second passage portions 83IT2 formed in the shim 831, the front end portions 83IT2S continuous to the second slots 83S2 are formed by half-etching along the partition wall portions 83IK. Accordingly, each front end portion 83IT2S includes an unremoved part of the plate material that forms the shim 831, concretely, by about a half of the plate thickness SHT of the shim 831. Thus, the feeding-direction size DH2 of each second slot 83S2 is about half of the plate thickness SHT of the shim 831.

Of the second passage portions 83IT2 of the shim 831, not only other portions than the front end portions 83IT2S formed by half etching but also the manifold portion 83IM and the first passage portion 83IT1 are formed by normal etching to remove the plate material throughout the thickness of the shim 831. Thus, the feeding-direction size DH1 of the first slot 83S1 is equal to the plate thickness SHT of the shim 831 (see FIGS. 15A to 15C).

Consequently, the feeding-direction size DH2 of the second slots 83S2 is about half of the feeding-direction size DH1 of the first slot 83S1 (DH2≈½DH1<DH1).

In the first embodiment, as described above, the feeding-direction size DH2 of the second slots 83S2 is set smaller than the feeding-direction size DH1 of the first slot 83S1, concretely, about half of DH1. Even while approximately equal pressures are applied to the positive active material paste PAP and the insulator paste IP, the high-viscosity positive active material paste PAP can be discharged at an appropriate amount from the first slot 83S1 and also the low-viscosity insulator paste IP can also be discharged at an appropriate amount from the second slots 83S2.

Since the front end portion 83IT2S formed by half etching includes an unremoved part of the plate material that forms the shim 831. Accordingly, even when the pressures to be applied to the positive active material paste PAP and the insulator paste IP are different from each other and thus a stress due to a differential pressure is applied to the partition wall portions 83IK, the partition wall portions 83IK can be prevented from deformation.

In the first embodiment, more concretely, in consideration of the front and back surfaces of the shim 83 formed in a symmetric pattern, the shim 831 is placed such that an unremoved part of the plate material forming the shim 831 by the half etching in the front end portion 83IT2S of each second passage portion 83IT2 is located on the feeding-direction upstream side HHU, and the front end portion 83T2S of the second passage 83T2 through which the insulator paste IP passes is located on the feeding-direction downstream side HHD. Specifically, the position of the second slots 83S2 is biased to the feeding-direction downstream side HHD relative to the position of the first slot 83S1, that is, each second slot 83S2 is off center from the first slot 83S1 in the feeding direction HH (see FIGS. 15A and 15C).

As is clear by comparison between FIGS. 15B and 15C, the above placement allows the insulator paste IP (see FIG. 15C) to be discharged later than the positive active material paste PAP (see FIG. 15B) when viewed in the feeding direction HH, as compared with a configuration that the front end portion 83IT2S is reversely biased to the feeding-direction upstream side HHU. Thus, the positive active material paste PAP and the insulator paste IP which attempt to spread in each width direction between the downstream-side lip portion 83DL of the die head 83 and the positive current collecting foil 22 are less likely to relatively strongly contact with each other. This can relatively prevent the positive active material paste PAP and the insulator paste IP from eddying and mixing in the vicinity of their interface.

To the contrary, when the position of the second slots 83S2 is biased to the feeding-direction upstream side HHU relative to the position of the first slot 83S1, the positive active material paste PAP and the insulator paste IP which attempt to spread in each width direction can relatively strongly contact with each other.

Referring to FIGS. 9 and 13 to 16, the following explanation is given to the behaviors of the positive active material paste PAP and the insulator paste IP (that is, the undried positive active material layer 23M and the undried insulator layers 24M) respectively discharged from the first slot 83S1 and the second slots 83S2 of the die head 83 and applied to the positive current collecting foil 22.

Figure 13:
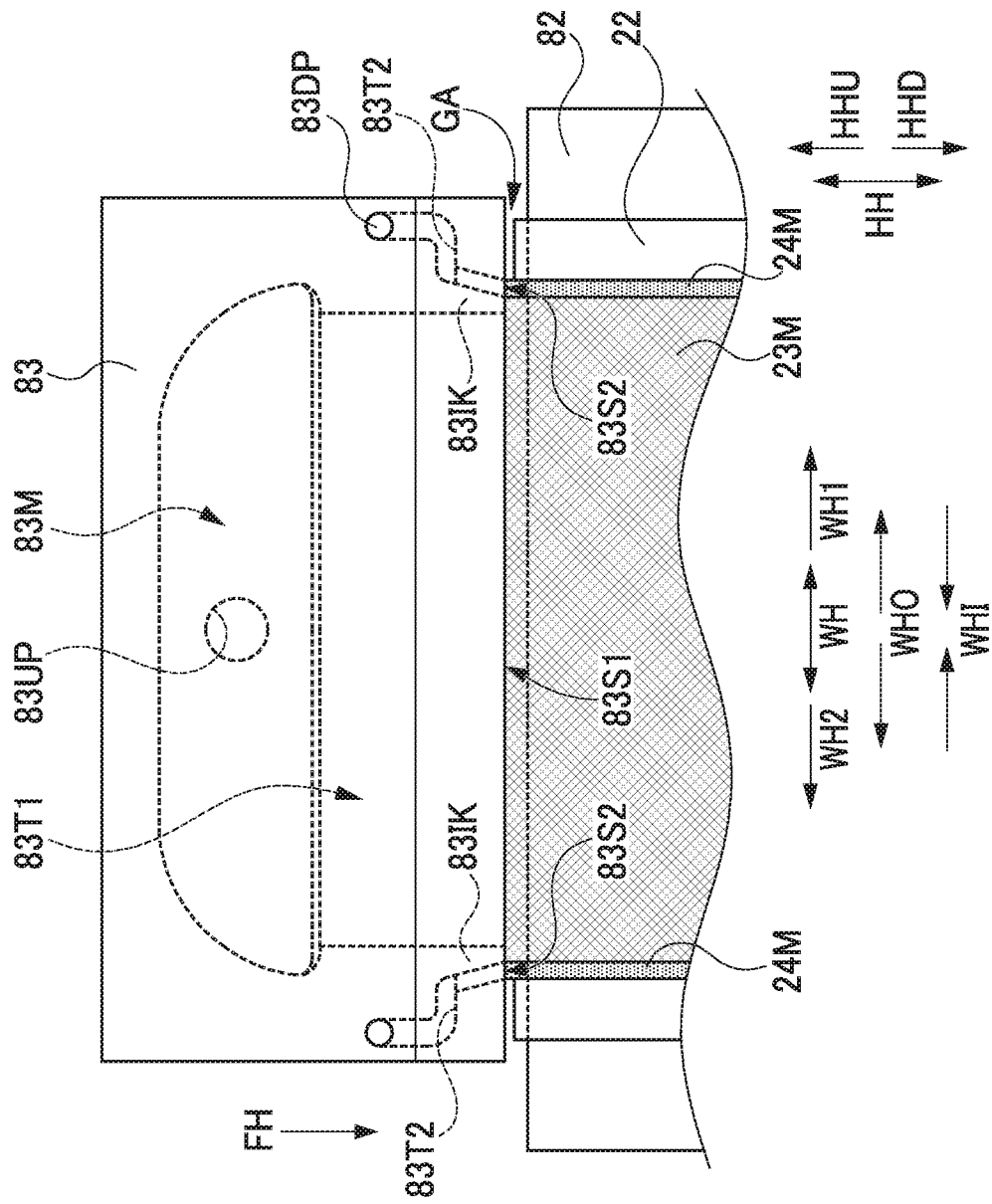
FIG. 13 is an explanatory view showing a manner of applying active material paste and insulator paste discharged from the die head to a positive current collecting foil in the first and second embodiments.

As shown in FIGS. 9 and 13, the positive active material paste PAP discharged from the first slot 83S1 of the die head 83 and the insulator paste IP discharged from the second slots 83S are applied to the positive current collecting foil 22 being wound around and fed forward from the backup roll 82, forming the undried positive active material layer 23M and the undried insulator layers 24M each in a strip shape. However, since the positive active material paste PAP and the insulator paste IP are discharged under pressure, the positive active material paste PAP and the insulator paste IP (the undried positive active material layer 23M and the undried insulator layer 24M), after applied to the positive current collecting foil 22, between the downstream-side lip portion 83DL and the positive current collecting foil 22 remain under a certain level of pressures. Accordingly, as indicated by broken lines in FIG. 15A, in this area (an area behind the downstream-side lip portion 83DL in a depth direction in FIG. 15A), the undried positive active material layer 23M and the undried insulator layer 24M each attempt to spread in the width direction WH while being fed toward the feeding-direction downstream side HHD (upward in FIG. 15A). The magnitude of spreading is roughly about 1% to 2% of the width-direction sizes DW1 and DW2 of the first slot 83S1 and the second slots 83S2.

In the first embodiment, meanwhile, the partition wall portions 83IK are provided one between the first slot 83S1 and each of the second slots 83S2 to discharge the positive active material paste PAP and the insulator paste IP at the distance DD. Thus, when the distance DD is set to for example of 1% or less of the sum of the width-direction size DW1 of the first slot 83S1 and the width-direction size DW2 of the second slot 83S2, no gap or space is left between the undried positive active material layer 23M and the undried insulator layer 24M each spreading in the width direction WH, between the downstream-side lip portion 83DL and the positive current collecting foil 22, so that those layers 23M and 24M can contact with each other (see FIG. 15A).

In other words, as shown in FIGS. 15A and 15B, the positive active material paste PAP discharged from the first slot 83S1 through the first passage 83T1 of the die head 83 toward the positive current collecting foil 22 wound around the backup roll 82 is applied to the positive current collecting foil 22 (see FIG. 16(a) which is a C-C' cross-sectional view in FIG. 15B), forming the undried positive active material layer 23M, and then is moved toward the feeding-direction downstream side HHD (upward in FIGS. 15A and 15B) in association with feeding of the positive current collecting foil 22.

Figure 16:
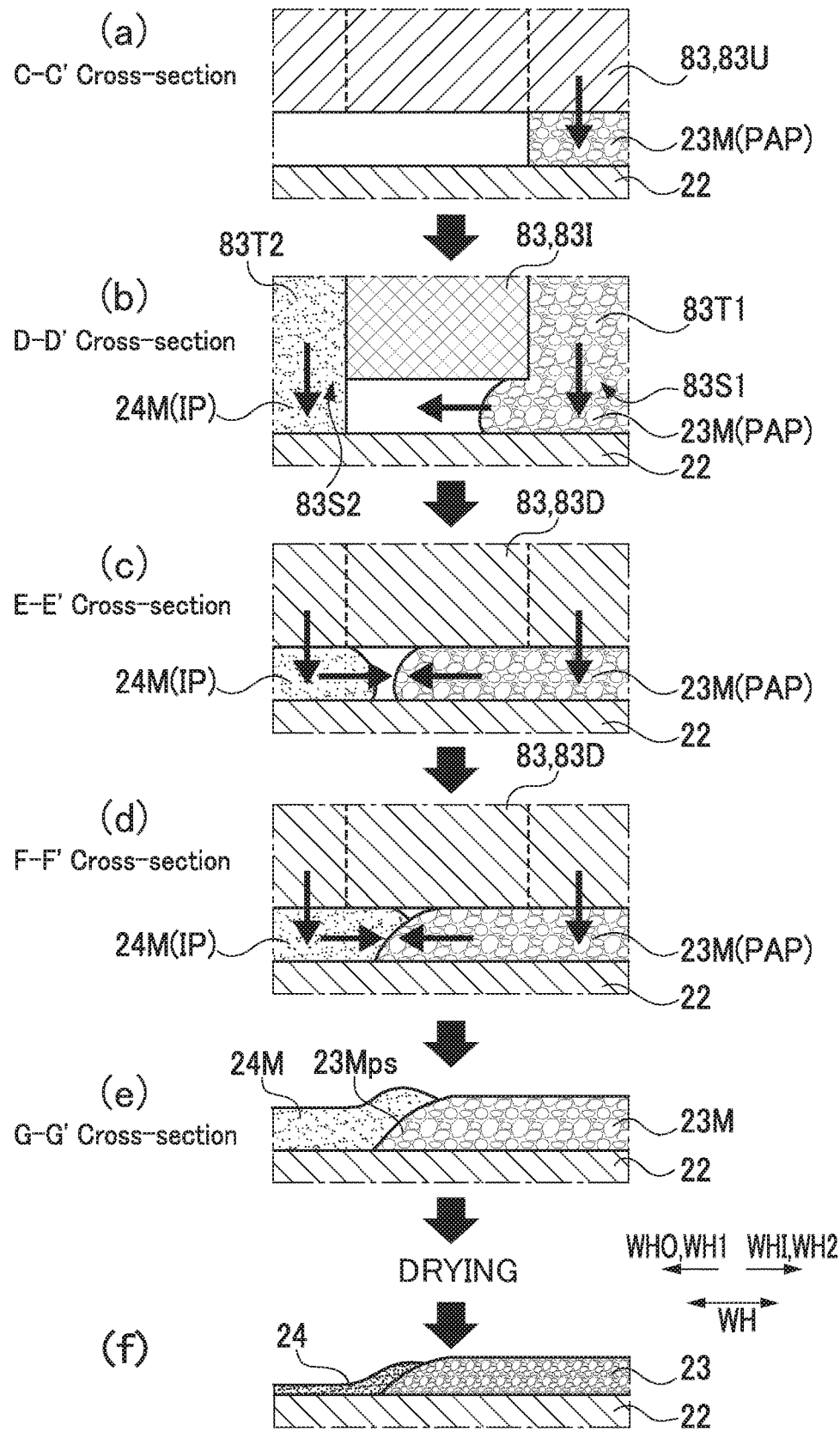
FIG. 16 is an explanatory view showing behaviors of the active material paste and the insulator paste discharged from the die head in the first and second embodiments, in which (a) shows behaviors of the pastes taken in C-C' in FIG. 15B, (b) shows behaviors of the pastes taken in D-D' in FIG. 15B, (c) shows behaviors of the pastes taken in E-E' in FIG. 15B, (d) shows behaviors of the pastes taken in F-F' in FIG. 15B, (e) shows behaviors of the pastes taken in G-G' in FIG. 15B, and (f) is a partially-enlarged cross-sectional view showing the configuration of a one-side layer edge portion and an insulator layer in a positive electrode sheet after drying.

At that time, the positive active material paste PAP (the undried positive active material layer 23M) not only spreads to the upstream-side lip portion 83UL of the die head 83 but also wet-spread over the downstream-side lip portion 83DL. The pressure applied to the positive active material paste PAP also acts at a certain level on the undried positive active material layer 23M (the positive active material paste PAP) located between the downstream-side lip portion 83DL and the positive current collecting foil 22. Accordingly, as described above, the undried positive active material layer 23M also spreads in the width-direction outside WHO (the width-direction one side WH1) as indicated by the broken lines in FIG. 15A. In FIGS. 16 (b), (c), and (d) which are respectively a D-D' cross-sectional view, an E-E' cross-sectional view, and an F-F' cross-sectional view in FIG. 15B, the undried positive active material layer 23M (the positive active material paste PAP) spreads leftward (toward the width-direction outside WHO, the width-direction one side WH1) between the downstream-side lip portion 83DL and the positive current collecting foil 22.

In contrast, as shown in FIGS. 15A and 15C, the insulator paste IP is discharged from the second slot 83S2 through the second passage 83T2 of the die head 83 toward the positive current collecting foil 22. In the first embodiment, however, as described above, the front end portion 83IT2S of the second passage portion 83IT2 of the shim 831 is formed by half etching so that the feeding-direction size DH2 of the second slot 83S2 is about half of the feeding-direction size DH1 of the first slot 83S1 and also the position of the second slot 83S2 is biased to the feeding-direction downstream side HHD relative to the position of the first slot 83S1. Accordingly, the insulator paste IP discharged from the second slot 83S2 is discharged at the feeding-direction downstream side HHD as compared with the positive active material paste PAP discharged from the first slot 83S1 (see FIGS. 15A to 15C).

As described above, the front end portion 83IT2S of the second passage portion 83IT2 of the shim 831 is formed obliquely, not perpendicular, to the second slot 83S2. In the first embodiment, as shown in FIG. 14, the center line CL of the front end portion 83IT2S of the second passage portion 83IT2 of the shim 831 is inclined at an inclination angle θ of 25°.

Accordingly, the die head 83 can discharge the insulator paste IP from the second slot 83S2 toward the positive current collecting foil 22 opposed thereto and also at the inclination angle θ toward the width-direction inside WHI (the width-direction other side WH2 or the width-direction one side WH1, that is, in a direction to approach the first slot 83S1). The insulator paste IP discharged at the inclination angle θ and applied to the positive current collecting foil 22 tends to spread toward the width-direction inside WHI on the positive current collecting foil 22, thus making it easy for the undried positive active material layer 23M and the undried insulator layer 24M to contact with each other on the positive current collecting foil 22.

The discharged insulator paste IP, after applied to the positive current collecting foil 22 (also see FIG. 16(b) which is a D-D' cross-sectional view in FIG. 15B), forms the undried insulator layer 24M, which is then moved to the feeding-direction downstream side HHD, i.e., upward in FIGS. 15A and 15C, in association with feeding of the positive current collecting foil 22.

At that time, the insulator paste IP (the undried insulator layer 24M) also wet-spreads over the downstream-side lip portion 83DL. The pressure applied to the insulator paste IP is also applied at a certain level to the undried insulator layer 24M (the insulator paste IP) located between the downstream-side lip portion 83DL and the positive current collecting foil 22. Accordingly, as described above, the undried insulator layer 24M also spreads in the width-direction inside WHI (the width-direction other side WH2) as indicated by the broken lines in FIG. 15A. In FIGS. 16 (c) and (d) which are respectively an E-E' cross-sectional view and an F-F' cross-sectional view in FIG. 15B, the undried insulator layer 24M spreads rightward, i.e., toward the width-direction inside WHI, or the width-direction other side WH2, between the downstream-side lip portion 83DL and the positive current collecting foil 22 and contacts with the undried positive active material layer 23M spreading leftward, i.e., toward the width-direction outside WHO, or the width-direction one side WH1.

When the undried positive active material layer 23M and the undried insulator layer 24M move beyond the downstream-side lip portion 83DL to the feeding-direction downstream side HHD, the pressure is no longer applied to those layers 23M and 24M. The undried insulator layer 24M is formed overlapping an undried positive electrode layer slant portion 23Mps of the undried positive active material layer 23M as shown in FIG. 16(e) which is a G-G' cross-sectional view in FIG. 15B (First coating step SP1, see FIG. 8).

By foregoing adjustments of the distance DD between the first slot 83S1 and the second slot 83S2, the bias of the position of the second slot 83S2 relative to the position of the first slot 83S1 in the feeding direction HH, and the inclination angle θ of the center line CL of the front end portion 83T2S of the second passage 83T2 of the die head 83 (i.e., the front end portion 83IT2S of the second passage portion 83IT2 of the shim 831), the contact state between the undried positive active material layer 23M and the undried insulator layer 24M is appropriately adjusted.

Subsequently, the undried positive active material layer 23M and the undried insulator layer 24M each formed in a strip shape on the surface 22S1 of the positive current collecting foil 22 are dried by hot air in the drying device 86, forming the positive active material layer 23 and the insulator layer 24 (First drying step SP2).

Furthermore, another undried positive active material layer 23M and another undried insulator layer 24M are also formed each in a strip shape on the opposite surface 22S2 of the positive current collecting foil 22 in a similar manner using the die coater 81 (Second coating step SP3), and then dried by hot air in the drying device 86 to form a positive active material layer 23 and an insulator layer 24 (Second drying step SP4). Thus, an uncut positive electrode sheet 21W (see FIG. 10) is formed. Subsequently, the uncut positive electrode sheet 21W is compressed by the roll press (not shown) for compaction of the positive active material layer 23 as described above (Press step SP5). This uncut positive electrode sheet 21W is cut along the imaginary cutting line BL, i.e., in half, and further cut at the predetermined longitudinal-direction length DL1 (Cutting step SP6). The finished positive electrode sheet 21 is thus obtained (Positive electrode sheet manufacturing process, see FIG. 5).

If the distance DD between the first slot 83S1 and the second slot 83S2 is set larger, as shown in FIGS. 16(c) and (*d*), the undried positive active material layer 23M and the undried insulator layer 24M, that is, the positive active material layer 23 and the insulator layer 24 formed by drying of those undried layers 23M and 24M may remain apart without contacting with each other. In this case, the insulator-layer support portion 22*i* of the positive current collecting foil 22 can be almost covered and insulated by the insulator layer 24; however, a gap exists between the positive electrode layer edge portion 23*p* (the slant portion 23*ps*) of the positive active material layer 23 and the insulator layer 24, in which gap the positive current collecting foil 22 is exposed. Thus, a conductive foreign substance(s) may be caught in such a gap and leads to a short-circuit.

Figure 7:
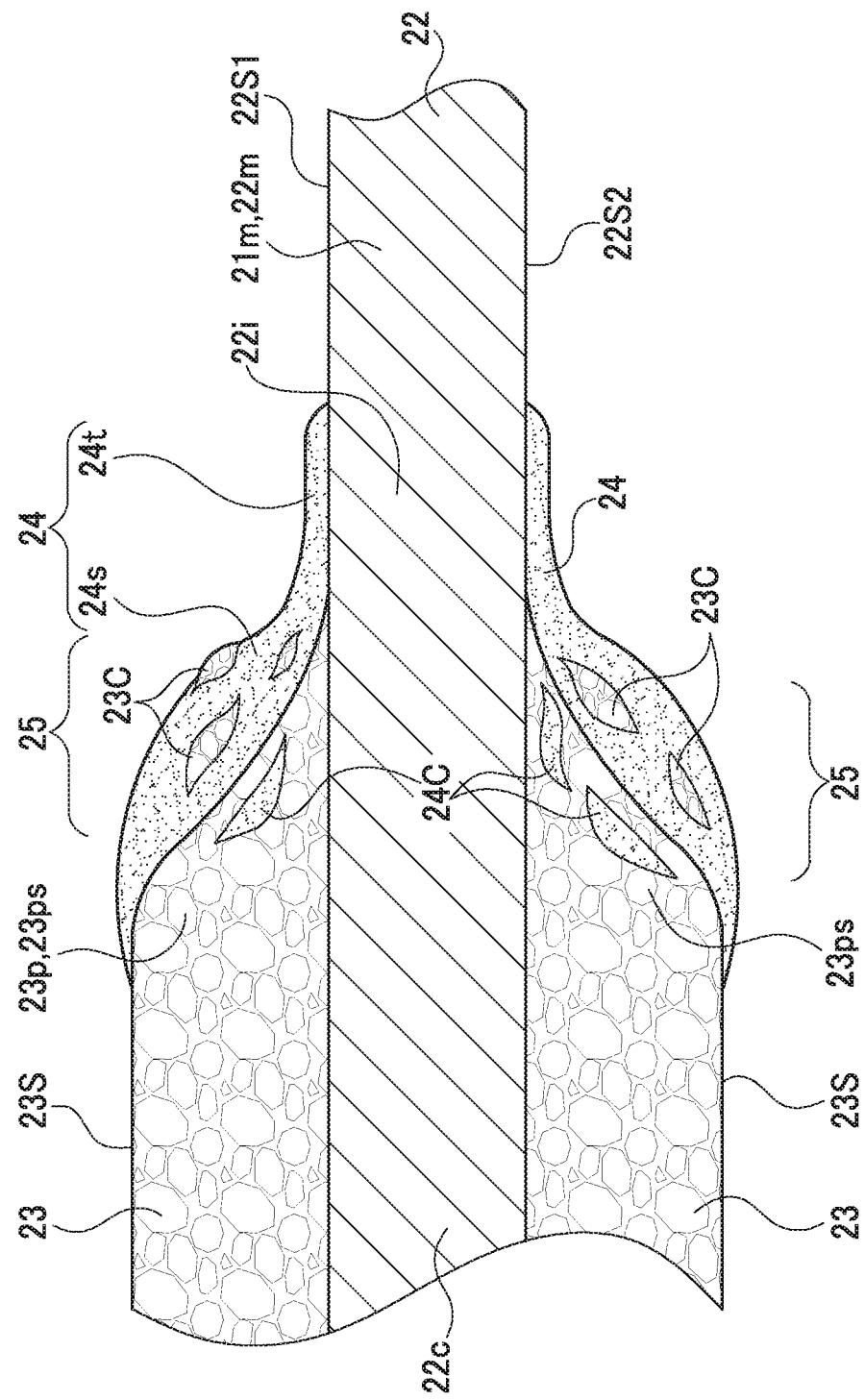
FIG. 7 is a partially-enlarged cross-sectional view showing the configurations when a mixing zone is generated by mixture of the one-side layer edge portion of the positive active material layer and the insulator layer in the positive electrode sheet in the first embodiment and the rectangular positive electrode sheet in the second embodiment.

Meanwhile, as shown in FIGS. 16 (*c*) and (*d*), at the interface between the undried positive active material layer 23M and the undried insulator layer 24M contacting each other, those layers may eddy and mix with each other depending on the strength of impact therebetween, which may generate a region in which they mix with each other in a marbling pattern. After those layers are dried, a finished positive electrode sheet 21 includes a mixing zone 25 in which a coexistent active material portion(s) 23C and a coexistent insulator portion(s) 24C respectively coexist in the insulator layer 24 and the positive active material layer 23 as shown in FIG. 7.

If such a mixing zone 25 is generated in a wide region due to strong impact between the undried positive active material layer 23M and the undried insulator layer 24M at their interface, the insulator layer 24 may override the top face 23S of the positive active material layer 23 in the mixing zone 25 and thus be located higher than the top face 23S. In the slant coating portion 24*s* of the insulator layer 24, the coexistent active material portions 23C mixed therein may be exposed in the slant coating portion 24*s* and thus the slant portion 23*ps* of the positive active material layer 23 could not be appropriately insulated by the slant coating portion 24*s* of the insulator layer 24.

Accordingly, to achieve appropriate contact strength between the undried positive active material layer 23M and the undried insulator layer 24M, the following conditions may be taken into consideration: for example, the distance DD between the first slot 83S1 and the second slot 83S2, and the measure of the inclination angle θ of the center line CL of the front end portion 83IT2S of the second passage portion 83IT2 of the shim 831 of the die head 83. Thus, the insulator layer 24 is configured to include the slant coating portion 24*s* that is located lower than the top face 23S of the positive active material layer 23 toward the positive current collecting foil 22 and covers at least the lower portion 23*psk* of the slant portion 23*ps* of the positive active material layer 23 and the foil coating portion 24*t* that extends from the slant coating portion 24*s* toward the width-direction outside WHO (i.e., the width-direction one side WH1 and the width-direction other side WH2 relative to the positive active material layer 23) and covers the insulator-layer support portion 22*i* of the positive current collecting foil 22.

Still further, the strength and the timing of impact when the undried positive active material layer 23M and the undried insulator layer 24M come into contact with each other may be adjusted in an appropriate relationship in order to adjust the pressures to be applied to the positive active material paste PAP and the insulator paste IP, the distance DD, the inclination angle θ, the bias of the position of the second slot 83S2 relative to the first slot 83S1 in the feeding direction HH so that the thickness Ts of the slant coating portion 24*s* of the insulator layer 24 is thicker than the thickness Tt of the foil coating portion 24*t*.

Separately from the above-mentioned manufacturing process of the foregoing positive electrode sheet 21, a strip-shaped negative electrode sheet 31 cut at a predetermined length in the longitudinal direction LH is produced in a well-known negative electrode sheet manufacturing process SN. Further, a pair of strip-shaped separators 41 cut at a predetermined length in the longitudinal direction LH is produced in a well-known separator manufacturing process SS (see FIG. 8).

Subsequently, the strip-shaped separators 41 are interposed in layers one by one between the strip-shaped positive electrode sheet 21 and the strip-shaped negative electrode sheet 31 (see FIG. 4). This laminated body is wound to form an electrode body 20 (see FIG. 3) (Electrode body manufacturing process SE1).

Using this electrode body 20, a battery 1 is assembled by a well-known method (Battery assembling process SE2). This battery 1 is subjected to initial charge and necessary inspection to remove any defective battery 1 and others (Initial charge-inspection process SE3). Thus, a completed battery 1 is obtained.

In this battery 1 incorporating the strip-shaped positive electrode sheet 21, the pressure can be applied uniformly over the top face 23S of the positive active material layer 23 in the wound electrode body 20 made of the positive electrode sheet 21. Thus, the battery 1 can exhibit stable properties.

In the manufacturing method of the battery 1, since the electrode body 20 is produced by use of the foregoing strip-shaped electrode sheet 21, the battery 1 can be easily manufactured at low cost.

Examples 1 to 3 and Comparative Examples 1 to 4

The present inventors studied the relationship of the distance DD between the first slot 83S1 and the second slot 83S2, the size of the partition wall portions 83IK, the inclination angle θ of the center line CL of the front end portions 83IT2S of the second passage portions 83IT2, the retraction distance HS of the front ends 83IKS of the partition wall portions 83IK of the shim 83 from the upstream-side lip portion 83UL of the upstream-side head body 83U and the downstream-side lip portion 83DL of the downstream-side head body 83D, with respect to the position of the insulator layer 24 and the generation of the mixing zone 25 of the positive active material layer 23 and the insulator layer 24 by mixing of the undried positive active material layer 23M and the undried insulator layer 24M.

Concretely, for Examples 1 to 3 and Comparative examples 1 to 4, shims 831 are prepared and positive electrode sheets 21 are produced. The cross-sections and others of those positive electrode sheets 21 were investigated and evaluation thereof was made based on studies about the presence/absence of the gap between the positive active material layer 23 and the insulator layer 24, the size of the mixing zone 25 of the positive active material layer 23 and the insulator layer 24, whether the insulator layer 24 is located lower or higher than the top face 23S of the positive active material layer 23, the coating state of the insulator layer 24 on the slant portion 23*ps* of the positive active material layer 23, and other conditions. A positive electrode sheet(s) 21 in which the insulator layer 24 is located "lower" than the top face 23S of the positive active material layer 23 and also the positive active material layer (the coexistent active material portion 23C, see FIG. 7) is not exposed is evaluated as "Good (○)" and the remaining positive electrode sheet(s) is evaluated as "Failure (X)". Each shim 831 was formed as in the first embodiment in which the front end portion 83IT2S of the second passage portions 83IT2 were formed by half etching so that the feeding-direction size DH2 of each second slot 83S2 is about half of the feeding-direction size DH1 of the first slot 83S1 and further the second slots 83S2 are biased to the feeding-direction downstream side HHD relative to the first slot 83S1.

Evaluation results of the positive electrode sheets 21 in Examples 1 to 3 and Comparative examples 1 to 4 are shown in Table 1.

generated. In addition, the larger the inclination angle θ is, the more greatly the size of the mixing zone 25 increases. From this relationship, it is conceivable that the spreading amount of the undried insulator layer 24M to the width-direction inside WHI has a positive correlation with the measure of the inclination angle θ. In Examples 1 to 3, it is revealed that the insulator layer 24 could cover the slant portion 23*ps* of the positive active material layer 23.

However, in Comparative examples 3 and 4, in which the distance DD is 0.30 mm and the retraction distance HS is 1.0 mm or 3.0 mm, if the positive active material paste PAP and

TABLE

|  | Distance DD between 1st and 2nd slots (mm) | Inclination angle θ of center line of front end portion of 2nd passage (deg) | Retraction distance HS (mm) | Gap between positive active material layer and insulator layer (mm) | Mixing zone of positive active material layer and insulator layer (mm) | Position of insulator layer relative to top face of positive active material layer | Covering state of one-side slant portion of positive active material layer by insulator layer | Combined decision |
|---|---|---|---|---|---|---|---|---|
| Comparative Example 1 | 1.00 | 20 | 0.0 | 0.23 | No mixing zone | Lower | Positive active material layer is exposed | X |
| Comparative Example 2 | 0.50 | 17.5 | 0.0 | 0.17 | No mixing zone | Lower | Positive active material layer is exposed | X |
| Example 1 | 0.50 | 20 | 0.0 | No gap | 0.21 | Lower | One-side slant portion is covered | ◯ |
| Example 2 | 0.50 | 25 | 0.0 | No gap | 0.34 | Lower | One-side slant portion is covered | ◯ |
| Example 3 | 0.50 | 27.5 | 0.0 | No gap | 0.59 | Lower | One-side slant portion is covered | ◯ |
| Comparative Example 3 | 0.30 | 20 | 1.0 | No gap | 0.85 | Higher | Positive active material layer is exposed in mixing zone | X |
| Comparative Example 4 | 0.30 | 20 | 3.0 | No gap | 1.23 | Higher | Positive active material layer is exposed in mixing zone | X |

According to Table 1, Comparative example 2 and Examples 1 to 3 are studied first. In these examples, every distance DD is 0.50 mm but the measure of the inclination angle θ is different. In Comparative example 2 with the inclination angle θ of 17.5°, a gap is generated between the positive active material layer 23 and the insulator layer 24 and no mixing zone 25 is generated in the positive active material layer 23 and the insulator layer 24. This is conceivable because the inclination angle θ is relatively small, a spreading amount of the undried insulator layer 24M to the width-direction inside WHI is small, not causing the undried positive active material layer 23M and the undried insulator layer 24M to contact with each other, and thus the mixing zone 25 is not generated in the positive active material layer 23 and the insulator layer 24. This reveals that the insulator layer 24 could not cover the slant portion 23*ps* of the positive active material layer 23.

In contrast, in Examples 1 to 3, the inclination angle θ is set to 20 to 27.5°, larger than in Comparative example 2. It is therefore conceivable that a spreading amount of the undried insulator layer 24M to the width-direction inside WHI is relatively large, causing the undried positive active material layer 23M and the undried insulator layer 24M to contact with each other, and thus the mixing zone 25 is the insulator paste IP are made to contact and mix with each other inside the die head 83 in advance before those pastes are discharged from the first and second slots 83S1 and 83S2, the size of the mixing zone 25 is 0.85 mm or more, which is too large. Further, the insulator layer 24 is located higher than the top face 23S of the positive active material layer 23, that is, the insulator layer 24 overrides the top face 23S. In addition, as exemplified in FIG. 7, the mixing zones 25 in these Comparative examples 3 and 4 are formed such that the coexistent active material portion 23C are exposed from the insulator layer 24. It is conceivable that these situations are caused by strong impact and mixture between the positive active material paste PAP and the insulator paste IP.

In Comparative example 1, the distance DD is set as large as 1.00 mm, a larger gap is left between the positive active material layer 23 and the insulator layer 24 than in Comparative example 2, and hence the mixing zone 25 is not generated in the positive active material layer 23 and the insulator layer 24. Although the inclination angle θ is 20°, the distance DD is so large as not to make the undried positive active material layer 23M and the undried insulator layer 24M to contact with each other and thus the mixing zone 25 is not generated in the positive active material layer 23 and the insulator layer 24.

Those results reveals, as described above, that it is desirable that the spreading amount of the undried insulator layer 24M in the width-direction inside WHI has a positive correlation with the measure of the inclination angle θ, the distance DD falls within an appropriate range, and the retraction distance HS is 0 mm, that is, there is no retraction distance.

According to the manufacturing method in the first embodiment, therefore, the first coating step SP1 and the second coating step SP3 uses the die head including the straight first slot 83S1 and the narrow second slots 83S2 arranged on each width-direction outside WHO of the first slot 83S1, i.e., on the width-direction one side WH1 and the width-direction other side WH2 relative to the first slot 83S1.

The undried positive active material layer 23M slightly spreads in the width direction WH and then becomes stable. The undried insulator layer 24M behave similarly.

Accordingly, the undried positive active material layer 23M applied on the positive current collecting foil 22 contacts with the undried insulator layer 24M from the width-direction inside WHI (the width-direction other side WH2 and the width-direction one side WH1 relative to the first slot 83S1), and a part of the undried insulator layer 24M overrides the undried positive electrode layer slant portion 23Mps of the undried positive active material layer 23M. Subsequently, in the first drying step SP2 and the second drying step SP4, the undried positive active material layers 23M and the undried insulator layers 24M are dried. Thus, a completed strip-shaped positive electrode sheet 21 including the positive active material layers 23 and the insulator layers 24 is obtained.

In the above manner, the die head 83 configured to discharge the active material paste PAP and the insulator paste IP at a distance DD to the positive current collecting foil 22 so that the undried positive active material layer 23M spreading in the width direction WH contacts with the undried insulator layer 24M from the width-direction inside WHI, i.e., the width-direction other side WH2 and the width-direction one side WH1 relative to the first slot 83S1.

Thus, the positive active material layer 23 and the insulator layer 24 are prevented from separating from each other and leaving a gap therebetween.

In contrast, another method is also conceivable in which the positive active material paste PAP and the insulator paste IP are discharged without the distance DD therebetween or alternatively the positive active material paste PAP and the insulator paste IP already contacting with each other in the die head 83 are discharged. In such cases, however, the undried positive active material layer 23M and the undried insulator layer 24M are caused to strongly contact with each other, resulting in excessive mixture at their interface.

In the first embodiment, in contrast, the undried positive active material layer 23M and the undried insulator layer 24M may generate the mixing zone 25 at their interface; however, excessive mixture is prevented and the degree of mixture is lowered as compared with the above case in which the first and second slots are arranged with no distance DD. The configuration in the first embodiment can therefore prevent the following configurations that the mixing zone 25 is largely generated, thereby causing the insulator layer 24 to partly override the top face of the positive active material layer 23 up to a "higher" level, and that the mixed positive active material layer 23 is partly exposed from the insulator layer 24, i.e., is not sufficiently covered by the insulator layer 24 (e.g., Comparative examples 3 and 4).

Specifically, the insulator layer 24 can be reliably formed to include the slant coating portion 24s that is located lower than the top face 23S of the positive active material layer 23 and covers the lower portion 23psk of the slant portion 23ps of the positive active material layer 23, and the foil coating portion 24t that extends continuously from the slant coating portion 24s toward the width-direction outside WHO, i.e., the width-direction one side WH1 or the width-direction other side WH2 relative to the positive active material layer 23.

In addition, in the first coating step SP1 and the second coating step SP3 and the first drying step SP2 and the second drying step SP4, the positive active material layers 23 and the insulator layers 24 are simultaneously formed and dried. Thus, an electrode sheet can be manufactured in a short process and at low cost.

Second Embodiment

The foregoing embodiment exemplifies the battery 1 incorporating the wound electrode body 20 including the strip-shaped positive electrode sheet 21 as a positive electrode sheet.

Figure 17:
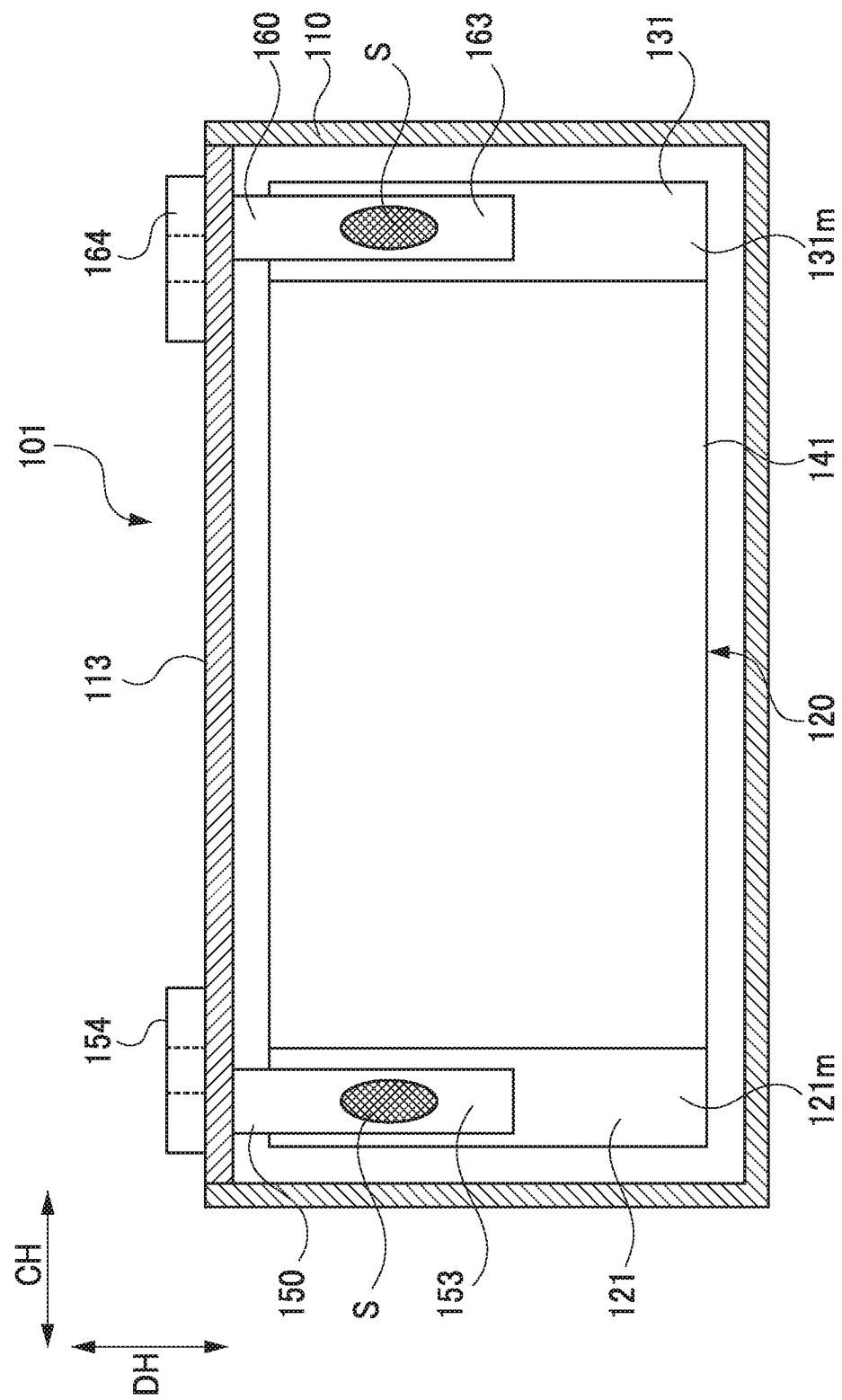
FIG. 17 is a vertical cross-sectional view of a battery in the second embodiment.

As another embodiment of the present disclosure, a laminated battery 101 may be configured to incorporate rectangular positive electrode sheets 121 produced by cutting the strip-shaped positive electrode sheet 21 at a predetermined longitudinal-direction length DL. Specifically, the battery 101 shown in FIG. 17 includes a battery case 110, a laminated electrode body 120 housed therein, a positive terminal member 150 and a negative terminal member 160 each supported in the battery case 110, and other components. Further, the battery case 110 contains an electrolyte (a nonaqueous electrolyte) not shown.

To a case lid member 113, a positive terminal member 150 consisting of an inner terminal member 153 and an outer terminal member 154 each made of aluminum is fixedly attached through an insulating member (not shown).

The inner terminal member 153 forming one end of this positive terminal member 150 is welded and electrically connected, at a welding area S, to a positive current collecting part 121m of a rectangular positive electrode sheet 121 of the electrode body 120 in the battery case 110, while the inner terminal member 153 extends out of the battery 101 through the case lid member 113 and is connected to the outer terminal member 154 forming the other end of the positive terminal member 150.

To the case lid member 113, furthermore, a negative terminal member 160 consisting of an inner terminal member 164 and an outer terminal member 164 each made of copper is fixedly attached through an insulating member (not shown). The inner terminal member 163 forming one end of this negative terminal member 160 is welded and electrically connected, at a welding area S, to a negative current collecting part 131m of a rectangular negative electrode sheet 131 of the electrode body 120 in the battery case 110, while the inner terminal member 163 extends out of the battery 101 through the case lid member 113 and is connected to the outer terminal member 164.

Figure 18:
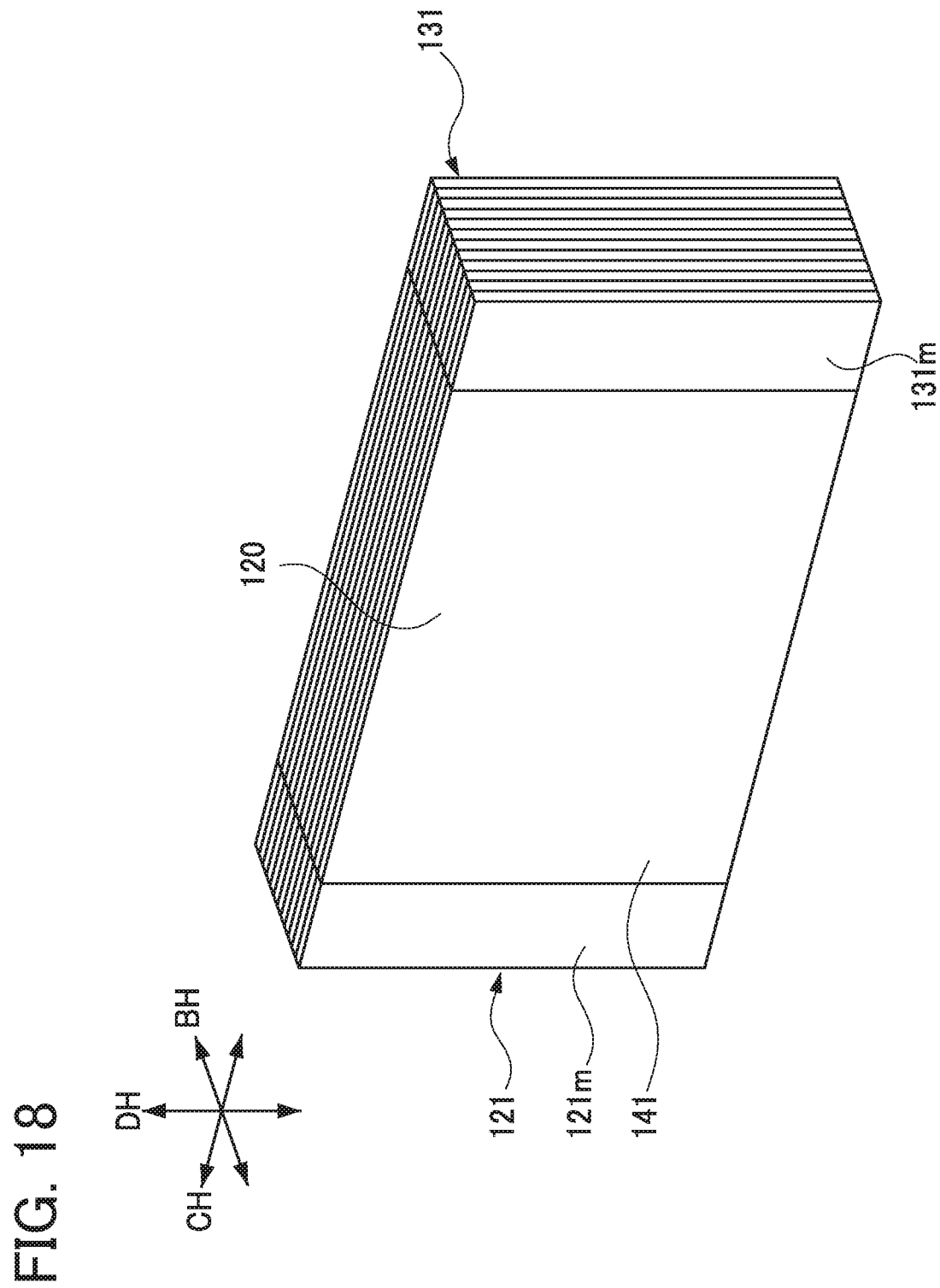
FIG. 18 is a perspective view of a lamination electrode body to be incorporated in the battery in the second embodiment.

The laminated electrode body 120 shown in FIG. 18 is configured such that the rectangular positive electrode sheets 121 and the rectangular negative electrode sheets 131, each having a rectangular plate shape, are alternately laminated by interposing therebetween rectangular separators 141 one by one. The rectangular negative electrode sheets 131 are produced in such a manner that the strip-shaped negative electrode sheet 31 in the first embodiment is cut at a predetermined length in the longitudinal direction LH. The rectangular separators 141 are also produced in such a manner that the strip-shaped separator 41 in the first embodiment is cut at a predetermined length in the longitudinal direction LH.

Figure 19:
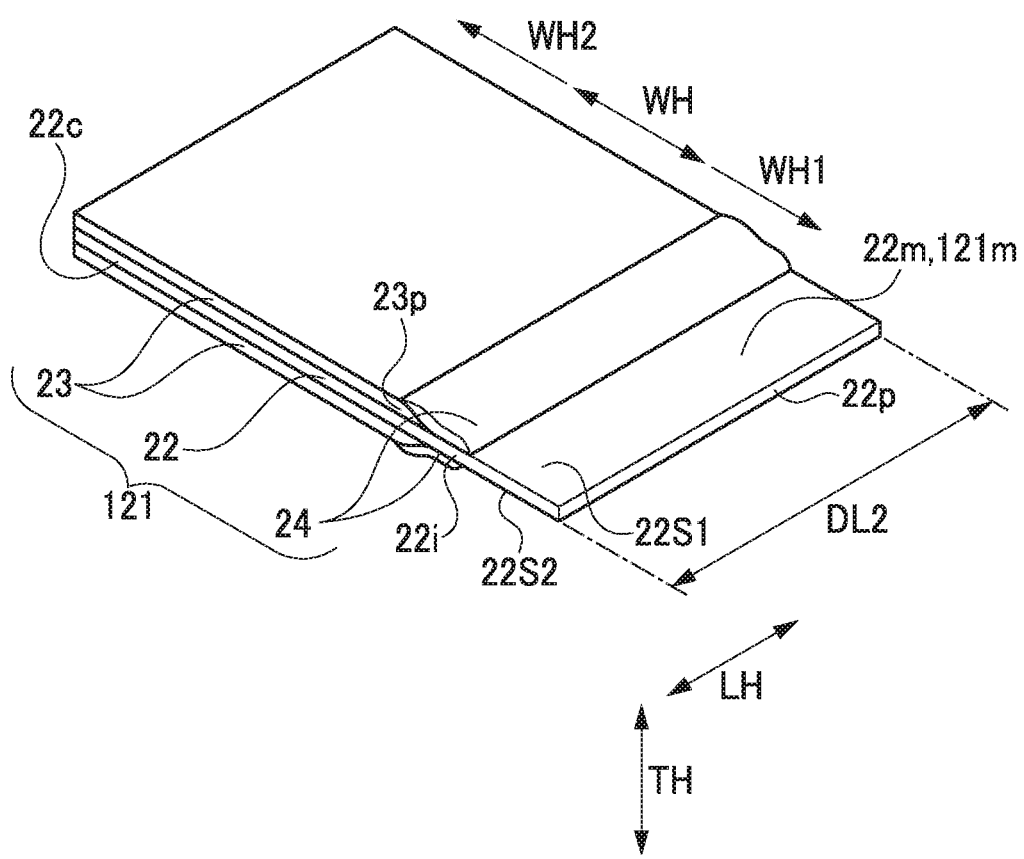
FIG. 19 is a perspective view of a rectangular positive electrode sheet in the second embodiment.

Similarly, the rectangular positive electrode sheet 121 shown in FIG. 19 is obtained in such a manner that the strip-shaped positive electrode sheet 21 (see FIG. 5) in the first embodiment is cut at a predetermined length DL2 in the longitudinal direction LH. Accordingly, as with the strip-shaped positive electrode sheet 21, the rectangular positive electrode sheet 121 includes the positive current collecting foil 22 made of an aluminum foil and extending in the longitudinal direction LH (corresponding to the battery vertical direction DH), the positive active material layers 23 containing positive active material particles 23f and others and the insulator layers 24 made of insulating resin and others, which are formed on each of the surfaces 22S1 and 22S2 of the positive current collecting foil 22.

The positive current collecting foil 22 includes the one-side foil edge 22p and the foil exposed portion 22m extending along the edge 22p in the longitudinal direction LH. This foil exposed portion 22m forms the positive current collecting part 121m which is welded and electrically connected to the inner terminal member 153 of the positive terminal member 150. The inner terminal member 153 of the positive terminal member 150 is welded to the positive current collecting part 121m, i.e., the foil exposed portion 22m. Other configurations of the rectangular positive electrode sheet 121 are identical to those of the positive electrode sheet 21 in the first embodiment and thus their details are not elaborated upon here.

Accordingly, when the rectangular positive electrode sheets 121 and the rectangular negative electrode sheets 131 are alternately laminated by interposing therebetween the rectangular separators 140 one by one to produce the laminated electrode body 120 and then the contact pressure is applied to the top faces 23S of the positive active material layers 23, the insulator layers 24 of the rectangular positive electrode sheets 121 in the second embodiment also enable the entire top faces 23S of the positive active material layers 23 to be subjected to uniform pressure, differently from the configuration that the insulator layers 24 are located higher than the top faces 23S of the positive active material layers 23.

In the battery 101 also incorporating the rectangular electrode sheets 121, the entire top faces 23S of the positive active material layers 23 of the laminated electrode body 120 can be applied with uniform pressure. Thus, the battery 101 can exhibit stable properties.

According to the method for manufacturing the rectangular electrode sheets 121 in the second embodiment, the strip-shaped electrode sheet 21 has only to be cut at a predetermined longitudinal-direction length DL2 in the longitudinal-direction cutting step SP6 (see FIG. 8). This method can easily manufacture the rectangular electrode sheets 121 at low cost. According to the method for manufacturing the foregoing laminated battery 101, the laminated electrode body 120 is produced by use of the foregoing rectangular electrode sheets 121. Thus, the battery 101 can be manufactured easily at low cost.

The foregoing first and second embodiments embodying the present disclosure are mere examples and give no limitation to the present disclosure. The present disclosure may be embodied in other specific forms without departing from the essential characteristics thereof.

For instance, in the first and second embodiments, the strip-shaped positive electrode sheet 21, the manufacturing method thereof, and others are exemplified as the strip-shaped electrode sheet, the rectangular electrode sheet, the electrode body, and the battery. However, the present disclosure is also applicable to a strip-shaped negative electrode sheet, a manufacturing method thereof, and others.

REFERENCE SIGNS LIST

BH Battery thickness direction
CH Battery lateral direction
DH Battery vertical direction
1, 101 Battery
20, 120 Electrode body
WH Width direction
WH1 One side (in width direction)
WH2 Other side (in width direction)
WHO Outside (in width direction)
WHI Inside (in width direction)
LH Longitudinal direction
TH Thickness direction
21 Positive electrode sheet (Strip-shaped electrode sheet)
121 Rectangular positive electrode sheet (Rectangular electrode sheet)
21m, 121m Positive current collecting part (Foil exposed portion)
DL1 Longitudinal-direction length (of strip-shaped positive electrode sheet)
DL2 Longitudinal-direction length (of rectangular positive electrode sheet)
22 Positive collecting foil (Electrode foil, Coated subject)
22S1, 22S2 Surface (of positive collecting foil)
22p One-side positive electrode foil edge (One-side foil edge)
22m Foil exposed portion
22c Active material layer support portion
22i Insulator layer support portion
23 Positive active material layer (Active material layer)
23S Top face of (of positive active material layer)
23p Positive electrode layer edge portion (One-side layer edge portion)
23ps Positive electrode layer slant portion (One-side slant portion)
23psk Lower portion (of Positive electrode layer slant portion)
23f Positive active material particle
PAP Positive active material paste (First paste)
23M Undried positive active material layer
23Mps Undried positive electrode layer slant portion (One-side slant portion)
24 Insulator layer
24s Slant coating portion
Ts Thickness (of slant coating portion)
24t Foil coating portion
Tt Thickness (of foil coating portion)
IP Insulator paste (Second paste)
24M Undried insulator layer
HH Feeding direction
HHU Feeding-direction upstream-side side
HHD Feeding-direction downstream-side side
80 Coating and drying apparatus
81 Die coater
83 Die head
GA Gap
83T1 First passage
83T2 Second passage 83T2S Front end portion (of second passage)
83S1 First slot
DH1 Feeding-direction size (of first slot)
DW1 Width-direction size (of first slot)
83S2 Second slot
DH2 Feeding-direction size (of second slot)
DW2 Width-direction size (of second slot)
DD Distance (between first and second slots)
83U Upstream head body
83UL Upstream lip portion
83D Downstream head body
83DL Downstream lip portion
83I Shim
SHT Thickness (of shim)
83IT1 First passage portion (Perforated opening)
83IT2 Second passage portion
83IT2S Front end portion (Unpenetrated opening) (of second passage portion)
CL Center line (of front end portion of second passage portion)
θ Inclination angle (of center line of front end portion of second passage)
83IK Partition wall portion (to partition between first and second passage portions)
83IKS Front end (of partition wall portion)
HS Retraction distance (of front end of partition wall portion from lip portion)
SP Positive electrode sheet manufacturing process
SP1 First coating step
SP2 first drying step
SP3 Second coating step
SP4 Second drying step
SP6 Cutting step
SE1 Electrode body manufacturing process
SE2 Battery assembling process
SE3 Initial charge and inspection process

What is claimed is:

1. A strip-shaped electrode sheet comprising:
a strip-shaped electrode foil extending in a longitudinal direction, the electrode foil including a one-side foil edge on one side in a width direction of the electrode foil and a strip-shaped foil exposed portion extending along the one-side foil edge in the longitudinal direction, in which the electrode foil is exposed;
a strip-shaped active material layer extending in the longitudinal direction, the active material layer being formed on an active-material-layer support portion of the electrode foil on an other side in the width direction relative to the foil exposed portion; and
a strip-shaped insulator layer extending in the longitudinal direction and containing insulating resin, the insulator layer being formed along a one-side layer edge portion of the active material layer located on the one side in the width direction and on an insulator-layer support portion of the electrode foil located between the foil exposed portion and the active-material-layer support portion,
wherein the one-side layer edge portion of the active material layer includes a one-side slant portion in which the active material layer has a thinner thickness as closer to the one side in the width direction,
the insulator layer is located lower than a top face of the active material layer toward the electrode foil, and
the insulator layer includes:
a slant coating portion that covers at least a lower portion of the one-side slant portion of the active material layer; and
a foil coating portion that extends from the slant coating portion toward the one side in the width direction to cover the insulator-layer support portion of the electrode foil;
wherein the slant coating portion of the insulator layer has a thickness at the center in the width direction, that is thicker than a thickness of the foil coating portion at the center in the width direction.

2. The strip-shaped electrode sheet according to claim 1, wherein the insulator layer contains inorganic insulation powder.

3. The strip-shaped electrode sheet according to claim 1, wherein the active material layer contains positive active material particles made of metal oxide.

4. A rectangular electrode sheet made of the strip-shaped electrode sheet according to claim 1, the strip-shaped electrode sheet being cut at a predetermined length in the longitudinal direction.

5. A battery incorporating the strip-shaped electrode sheet according to claim 1.

6. A battery incorporating the strip-shaped electrode sheet according to claim 2.

7. A battery incorporating the strip-shaped electrode sheet according to claim 3.

8. A battery incorporating the strip-shaped electrode sheet according to claim 4.

* * * * *